United States Patent [19]
Merhav

[11] Patent Number: 4,870,588
[45] Date of Patent: Sep. 26, 1989

[54] SIGNAL PROCESSOR FOR INERTIAL MEASUREMENT USING CORIOLIS FORCE SENSING ACCELEROMETER ARRANGEMENTS

[75] Inventor: Shmuel J. Merhav, Palo Alto, Calif.

[73] Assignee: Sundstrand Data Control, Inc., Redmond, Wash.

[21] Appl. No.: 789,658

[22] Filed: Oct. 21, 1985

[51] Int. Cl.[4] .............................................. G01C 21/10
[52] U.S. Cl. .................................... 364/453; 364/566; 73/510; 73/517 R; 73/178 R
[58] Field of Search .................... 364/453, 454, 566; 73/504, 510, 511, 514, 517 R, 178 R

[56] References Cited

U.S. PATENT DOCUMENTS

| | | | |
|---|---|---|---|
| 3,948,096 | 4/1976 | Miller | 364/566 |
| 4,222,272 | 9/1980 | Mairson | 364/453 |
| 4,303,978 | 12/1981 | Shaw et al. | 364/453 |
| 4,445,376 | 5/1984 | Merhav | 73/510 |
| 4,590,801 | 5/1986 | Merhav | 73/510 |
| 4,601,206 | 7/1986 | Watson | 73/514 |
| 4,665,748 | 5/1987 | Peters | 73/510 |

OTHER PUBLICATIONS

"Inertial Guidance Engineering", by Fernandez et al., Prentice-Hall Inc., Englewood Cliffs, N.J., 1962, pp. 90–97.
"In-Flight Alignment and Calibration of Inertial Measurement Units–Parts I and II", by Baziu et al., IEEE, AES, vol. AES-8, No. 4, Jul. 1972, pp. 439–465.
"Stable-Member Mounted Instrument Environment Simulation Model Development", by Barnes, IEEE, AES, vol. AES-4, No. 6, Nov. 1972, pp. 780–790.

Primary Examiner—Parshotam S. Lall
Assistant Examiner—V. N. Trans
Attorney, Agent, or Firm—Christensen, O'Connor, Johnson & Kindness

[57] ABSTRACT

Disclosed is a method and apparatus for processing signals supplied by accelerometer assemblies in which one or more accelerometers are cyclically displaced in a predetermined manner so that signals representing the specific force experienced by the accelerometers and the angular rate experienced by the accelerometers are produced. The signal processor separately estimates the signal components of the signal being processed and provides an error signal by subtracting the estimated signal components from the signal being processed. The error signal is fed back through circuitry that controls the magnitude of the estimated signal components so that the value of each estimated signal component rapidly converges to the value of the signal components of the signal being processed. In an arrangement for determining the angular rate of one or more pair of cyclically displaced accelerometers, the signal processor includes a signal component that is in-phase with the signal that oscillates the accelerometer pair, a signal component that is in phase quadrature with the signal that displaces the accelerometer pair and a signal component that corresponds to random unmodulated additive noise. In this arrangement, a signal summing unit subtracts estimates of each signal component from the signal being processed to supply an error signal equal to $(a_1 - \hat{a}_1) \cos \omega t + (a_2 - \hat{a}_2) \sin \omega t + (a_3 - \hat{a}_3)$, where $a_1$, $a_2$, and $a_3$, respectively represent the values of the in-phase, quadrature and random noise components of the signal being processed and $\hat{a}_1$, $\hat{a}_2$, and $\hat{a}_3$ represent estimates of those signal component values. To obtain $\hat{a}_3$, the error signal is scaled and integrated. To obtain the $\hat{a}_1 \cos \omega t$ signal estimate, the error signal is multiplied by $\cos \omega t$, and scaled to obtain a signal representative of the derivative with respect to time of $\hat{a}_1$. This signal is then integrated and multiplied by $\cos \omega t$. The signal component $\hat{a}_2 \sin \omega t$ is obtained in a similar manner by multiplying the error signal by $\sin \omega t$, scaling, integrating and multiplying the integrated signal by $\sin \omega t$. In such an arrangement, angular rate is obtained by scaling the $\hat{a}_1$ signal estimate. In addition, the signal estimates can be used in an inertial navigation system that employs the invention to eliminate misalignment of the accelerometer pairs and to improve system operation by eliminating phase shift between the signal source that oscillates the accelerometer pairs and the signals provided by the accelerometer pairs.

26 Claims, 6 Drawing Sheets

SIGNAL PROCESSOR FOR INERTIAL MEASUREMENT USING CORIOLIS FORCE SENSING ACCELEROMETER ARRANGEMENTS

TECHNICAL FIELD

This invention relates to apparatus and methods for measuring specific force (sometimes referred to as linear acceleration) and angular rate (sometimes referred to as angular velocity) of a moving body. More specifically, this invention relates to apparatus and methods for processing the angular rate signals and/or the specific force signals of accelerometer arrangements that are cyclically vibrated or rotated so that each accelerometer of the accelerometer arrangement provides an output signal having a signal component that is representative of the Coriolis force experienced when a body that carries the accelerometer arrangement rotates.

BACKGROUND OF THE INVENTION

In recent years, considerable effort has been devoted to developing small, economical and reliable angular rate sensors for use in inertial navigation systems and other applications. Although these efforts have resulted in the development of new gyroscopic devices such as the ring laser gyro and the dry-tuned-rotor two axes gyroscope, gyroscopic devices still present fairly significant size, cost and reliability tradeoffs. This is especially true relative to inertial navigation systems which require the precise measurement of the three components of specific force along the axes of the vessel or object being navigated and the three components of angular rate about those axes. The problem becomes even more significant in strapdown inertial navigation systems because such systems require a large dynamic range of angular rate measurement and long-term, null-point stability.

Accordingly, effort also has been directed to developing angular rate sensors that operate on principles other than gyroscopic effect. In one such proposal, one or more accelerometers are mounted with the force sensing axis of each accelerometer being parallel to and spaced apart from a Cartesian coordinate axis of the body whose rotation is to be measured and with each accelerometer being cyclically displaced (oscillated) along a predetermined path. In these arrangements, the output signal provided by each accelerometer includes specific force and Coriolis components that can be processed to provide a signal representative of specific force along a first coordinate axis of the coordinate system and, in addition, signal components that are representative of the angular rate about the second and third axes of the coordinate system. Thus, such arrangements can utilize as few as three accelerometers to provide measurement of the three specific force components and three angular rate components that fully describe the motion of a body that is moving in space (e.g., an aircraft, space vehicle or other object that is being navigated).

Merhav U.S. Pat. No. 4,445,376, issued on May 1, 1984, discloses an arrangement of the above-described type in which three accelerometers supply output signals that can be processed to provide the specific force components and the angular rate components relative to each axis of a righthand Cartesian coordinate system that is fixed within a moving body. In the arrangement disclosed in U.S. Pat. No. 4,445,376, each accelerometer is mounted so that the force sensitive axis of the accelerometer is parallel to an axis of the coordinate system (e.g., the X axis). In addition each accelerometer is mounted (or internally configured) so that the force sensitive axis rotates at a uniform rate about a fixed axis which is parallel to and spaced apart from the force sensitive axis. As the object with which the coordinate system is associated moves in space, the signal that is generated by each accelerometer includes a component representative of specific force along the coordinate direction in which the accelerometer force sensitive axis points and signal components representative of angular rate relative to the coordinate axes that are perpendicular to the accelerometer force sensitive axis. For example, in the specific arrangement disclosed in U.S. Pat. No. 4,445,376, the accelerometer that generates a signal representative of the X axis component of specific force and the Y and Z axes components of angular rate has the force sensitive axis of the accelerometer parallel to the X axis and rotates about a fixed axis of the coordinate system so that the force sensitive axis remains parallel to the X axis and circles the fixed axis at a constant radius.

In the signal processing arrangement disclosed in U.S. Pat. No. 4,445,376, each angular rate signal is obtained from an accelerometer output signal by a synchronous detection process in which the accelerometer output signal is modulated by a periodic function that is synchronized to the rotation of the accelerometer (e.g., the algebraic sign of cos $\omega t$, where $\omega$ represents the rate at which the accelerometer moves about its center of rotation). The modulated signal is then integrated over the period required for the accelerometer to complete one revolution and the resulting signal is scaled to provide the angular rate signal. The specific force signal is obtained by integrating the accelerometer output over a rotational period (without modulation of the signal), with the resulting signal being multiplied by a predetermined scale factor.

Several arrangements of the above-discussed type wherein accelerometers are mounted for vibration or oscillation (rather than rotation) so as to supply a signal that can be processed to provide the specific force along one axis of the coordinate system and the angular rotation associated with another axis of a coordinate system are disclosed in Shmuel J. Merhav, U.S. patent application Ser. No. 528,776, filed Sept. 2, 1983. That patent application is entitled "Apparatus For Measuring Inertial Specific Force and Angular Rate of A Moving Body, And Accelerometer Assemblies Particularly Useful Therein," and is assigned to the assignee of the present invention.

In the first arrangement of the referenced patent application, each accelerometer is mounted so that its force sensing axis extends orthogonally from a plane that includes two axes of a Cartesian coordinate system (e.g., the Y-Z plane) and so that the accelerometer force sensitive axis intersects one of the two axes (e.g., the Z axis) at a point which may be remote from the origin of the coordinate system. In addition, each accelerometer is mounted or internally configured so that accelerometer force sensitive axis is displaced back and forth along a coordinate axis in the reference plane at a uniform cyclic rate. As is illustrated in the referenced patent application, the signal provided by such an accelerometer can be processed in the manner disclosed in the above-referenced U.S. Pat. No. 4,445,376 to supply the specific force component relative to the coordinate axis that is parallel to the force sensing axis of the accelerometer and to supply the angular rate component for a second coordinate axis, which is mutually orthogonal to the axis along which the accelerometer is displaced and the coordinate axis that is in alignment with the accelerometer force sensitive axis. For example, an accelerometer mounted with its force sensitive axis orthogonal to the Y-Z plane and configured for cyclic displacement of the force sensitive axis in the Z direction (along the Z axis), provides an output signal that can be processed to obtain the X axis component of specific force and the Y axis component of angular rate. Thus, by utilizing three accelerometers that are mounted for linear displacement (cyclic motion) along each of the three axes of a coordinate system, a complete specification of the movement of a body can be obtained.

The above-referenced patent application also discloses three arrangements wherein a pair of accelerometers is associated with a coordinate axis of a moving body to generate a signal that can be processed to obtain the specific force component relative to one coordinate axis of the body and the angular rate component for a different coordinate axis of the body. In one of these paired accelerometer arrangements, the force sensitive axes of the two accelerometers are parallel to one another and parallel to the coordinate axis for which a specific force measurement is to be obtained. In addition, the accelerometers are positioned such that the force sensitive axis of each accelerometer is equally spaced apart from a second coordinate axis and is perpendicular to a line that extends through the second coordinate axis. In this arrangement, the accelerometers are driven or internally configured so that the force sensitive axes of the accelerometers cyclically rotate through a small angle of deflection. This causes the force sensitive axes of the two accelerometers to cyclically move back and forth along lines that are equally spaced apart from the second coordinate axis. For example, in such an arrangement, the force sensing axes of a pair of accelerometers that are mounted for providing a signal that can be processed to obtain the X axis component of specific force and the Y axis component of angular rate are: (a) equally spaced apart from the Z coordinate axis; (b) mounted with the force sensitive axes extending in the X direction; and, (c) configured and arranged so that the accelerometer force sensing axes move cyclically back and forth along arcuate paths (chords of a circle) that approximate straight lines that are parallel to the Z axis and lie in the Y-Z plane.

In a second paired accelerometer arrangement of the referenced patent application, each accelerometer of an accelerometer pair is equally spaced apart from a coordinate axis with the force sensitive axes of the two accelerometers being colinear with a line that extends through a point on the same coordinate axis. In this arrangement, the accelerometers are aligned with a second axis of the coordinate system and are mounted for sensing oppositely directed specific forces. Further, the accelerometers are cyclically and simultaneously moved back and forth along a small arcuate path that lies in a plane that includes the force sensitive axes of the accelerometers and the coordinate axis with which the force sensitive axes of the accelerometers intersect. For example, in such an arrangement, a pair of accelerometers that are mounted with the force sensitive axes pointing in the X direction oscillate at a uniform cyclic rate along oppositely disposed chords of a circle that lies in the X-Z coordinate plane. As is the case with the other arrangements disclosed in the previously mentioned patent and the referenced patent application, the signal supplied by the accelerometers whose force sensitive axes extend in the X direction can be processed to provide a signal representative of the X axis specific force component and a signal representative of the Y axis angular rate component.

In the third paired accelerometer arrangement disclosed in the referenced patent application, the spatial relationship between the force sensing axes of each accelerometer pair and the coordinate system is identical to the above-discussed second arrangement. The difference between the second and third arrangements is that the accelerometers of the third arrangement are configured and arranged for cyclical displacement of the force sensitive axes of the two accelerometers of each accelerometer pair along straight line paths (with both force sensitive axes moving in the same coordinate direction) rather than being configured and arranged for cyclically displacing the force sensitive axes along chords of a circle that approximate straight lines (with the two force sensitive axes moving in opposite directions). In this third arrangement, the signals provided by each pair of accelerometers can be processed to supply a signal representative of the specific force component for the coordinate axis that is parallel to the force sensitive axes of the accelerometers and to supply the angular rate component for the coordinate axes that is normal to the plane in which the force sensitive axes of the accelerometers oscillate.

As is disclosed in the referenced patent application, when the signals provided by each pair of accelerometers in the three disclosed paired accelerometer arrangements are added and subtracted, two separate signals are obtained (a "sum" signal and a "difference" signal), with one of the signals being substantially devoid of the specific force component and the other signal being substantially devoid of the angular rate component. In addition, the signal-to-noise ratio of the sum and difference signal theoretically is improved by a factor of $\sqrt{2}$ relative to the signals provided by each of the accelerometers. The sum and difference signals obtained from each accelerometer pair are then separately processed in the manner disclosed in the referenced U.S. patent to provide a signal representative of the desired specific force component and a signal representative of the desired angular rate component.

Although the synchronous detection signal process that is disclosed in the referenced patent and referenced patent application can be satisfactory in some situations, certain disadvantages and drawbacks are encountered. Firstly, the specific force signal and rate signal that are provided may include a signal component (ripple) at the signal processing modulation frequency (i.e., at the frequency at which the accelerometers are rotated or oscillated). Removal of this ripple component with a low-pass filter can decrease the bandwidth of the accelerometer system to an unacceptable degree. At the very least, the bandwidth of the signal processing arrangement disclosed in the referenced patent and patent application is limited to one-half the modulation frequency and, angular rates averaged over each period may be somewhat in error due to uncompensated weighting effects associated with the oscillation waveform. Further, the signal processing disclosed in the referenced patent application and patent is typically implemented with analog circuit devices. Current commercially available devices of the type used in such circuitry often exhibit temperature dependency or other characteristics that can cause errors in the specific force and angular rate signals (drift).

SUMMARY OF THE INVENTION

In accordance with the invention, signals that are supplied by various arrangements of oscillating accelerometers can be processed to determine the angular rate components (and/or the specific force components) of a moving object (e.g., an aircraft, space vehicle or other vessel). Basically, the invention involves an adaptive signal estimation process in which an estimate of each primary signal component of the signal being processed is separately and continuously generated and subtraced from the signal being processed to provide an error signal. The error signal is continuously processed to improve each of the estimated signal components so that least mean squared estimation is achieved. Absent mechanical misalignment of the accelerometers relative to the coordinate system of the moving body and absent phase shift between the signals that oscillate the accelerometers and the signals that are supplied by the accelerometers, angular rate (or specific force) is precisely determined on the basis of the value of one of the estimated signal components.

In the embodiment discussed herein, the signals processed are provided by any one of the vibrating accelerometer arrangements disclosed in the previously referenced Merhav U.S. patent application. That arrangement, as well as various other arrangements, result in a signal that includes a signal component that is ideally in-phase with the cyclic oscillation of the accelerometer (an in-phase component); a signal component that is in phase quadrature with the in-phase component; and a signal component that corresponds to unmodulated random noise. In the signal processors disclosed herein, signal estimates of each of these signal components are subtracted from the signal being processed to provide an error signal. The error signal is then scaled and multiplied by a signal that is in-phase with the in-phase component of the signal being processed to provide a signal representative of the derivative with respect to time of the estimated in-phase signal component. In a similar manner, a signal representative of the derivative with respect to time of the second estimated signal component is obtained by scaling the error signal and multiplying the resultant signal by a signal that is in phase quadrature with the in-phase signal component. A signal representative of the derivative with respect to time of the current estimated random noise component is obtained by simply scaling the error signal. The signal representative of the derivative with respect to time of the in-phase signal component is then integrated and multiplied by an in-phase signal to provide the signal estimate of the in-phase component of the signal being processed. In a similar manner, the signal representative of the derivative with respect to time of the second signal estimate is integrated and multiplied by a signal that is in phase quadrature with the in-phase component to provide a signal estimate of the phase quadrature signal component of the signal being processed. The total error signal is scaled and integrated to provide a signal estimate of the random noise component of the signal being processed.

In one disclosed embodiment, the above-discussed process is realized by conventional analog circuitry. As shall be recognized upon understanding the operating principles of the invention, equivalent realizations of the invention can be attained by the use of a programmed microprocessor circuit or other conventional digital circuit arrangements.

The signal processing method and signal processor circuits of this invention are especially useful in inertial measurement units of the type that include three or more pairs of oscillating accelerometers for measuring the three specific force components and three angular rate components that fully describe motion of the object that contains or carries the accelerometers. As shall be realized upon understanding the invention, the signal processing method and signal processing apparatus of the invention provides low noise operation and accurately determines angular rate components in the presence of random, high-frequency vibration of the accelerometer arrangement. In addition, the signal estimates provided by the invention can be utilized to adjust the inertial measurement unit accelerometer assemblies to eliminate mechanical misalignment of the accelerometers and to eliminate phase shift between the signal that drives the accelerometers and the accelerometer output signals. In two disclosed embodiments, additional improvement is obtained relative to precise estimation of each signal component. In one of these embodiments, the signal processor is arranged to provide signals suitable for driving circuitry that continuously maintains the accelerometers of the inertial measurement unit in proper mechanical alignment.

BRIEF DESCRIPTION OF THE DRAWING

These and other features and advantages of the invention will be more readily understood in view of the following detailed description, taken in conjunction with the accompanying figures, wherein.

DETAILED DESCRIPTION

Figure 1:
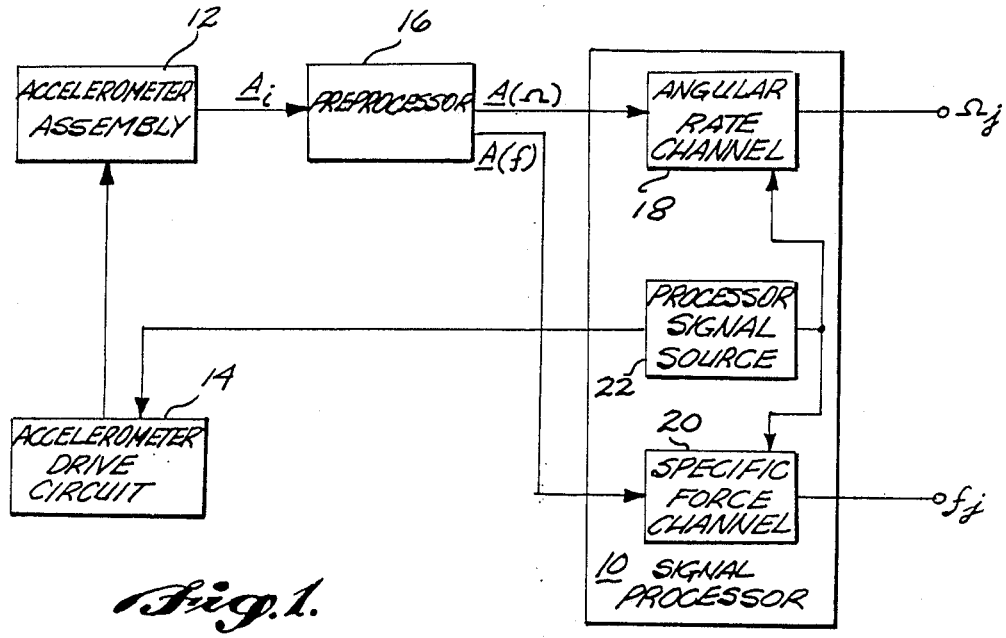
FIG. 1 is a block diagram that generally depicts a signal processor constructed in accordance with the invention, interconnected with an accelerometer assembly and other apparatus to form an inertial measurement unit for supplying signals representative of one or more angular rate components and one or more specific force components relative to a coordinate system that is associated with the accelerometer assembly.

FIG. 1 generally illustrates a signal processor 10 that is constructed in accordance with this invention and is interconnected with an accelerometer assembly 12, an accelerometer drive circuit 14 and a preprocessor 16 to form an inertial measurement unit of the type described in U.S. Pat. No. 4,445,376 and U.S. patent application, Ser. No. 528,776, filed Sept. 2, 1983. As is indicated in FIG. 1, and as described more fully in the referenced patent and patent application, in the depicted inertial measurement unit each accelerometer included in accelerometer assembly 12 is cyclically vibrated or rotated by accelerometer drive circuit 14. As acceleometer assembly 12 moves in inertial space (translates and rotates) accelerometer assembly 12 provides a set of signals $A_i$, $i=1, 2, \ldots, n$ (where n is equal to the number of accelerometers included in accelerometer assembly 12) to preprocessor 16. In arrangements of FIG. 1 that are being currently developed with this invention, accelerometer assembly 12 includes three pairs of accelerometers that are mounted and arranged in the manner described in the referenced patent application so that the set of signals, $A_i$, includes six signals $a_x^1$, $a_x^2$, $a_y^1$, $a_y^2$, $a_z^1$, and $a_z^2$, where the subscript identifies the coordinate axis with which a pair of accelerometers is associated and the numerical superscript indicates the first and second accelerometers of that particular pair of accelerometers. In such an application of the invention, preprocessor 16 adds the signals associated with each pair of accelerometers and, in addition, substracts the signals associated with each pair of accelerometers to provide a set of three sum signals and a set of three difference signals.

As is disclosed in the referenced patent application, one set of the signals is substantially devoid of specific force components and the second set of signals substantially devoid of angular rate components. In the system of FIG. 1, the set of signals that is substantially devoid of specific force components is denoted as $A(\Omega)$ and is supplied to an angular rate channel 18 of signal processor 10. The set of signals that is substantially devoid of angular rate signals is denoted as $A(f)$ and is supplied to a specific force channel of signal processor 10. As shall be described herein, angular rate channel 18 includes a signal estimator (optimal filter) of the type shown in FIG. 6 for each coordinate axis for which an angular rate signal is to be obtained (three in a conventional inertial measurement unit). As shall be recognized upon understanding the signal processor of this invention and its implementation in the arrangement of FIG. 1, specific force channel 20 can include a like number of signal estimators for determining the three components of angular rate. However, since the signals included in $A(f)$ exhibits a higher signal-to-noise ratio than the signals of $A(\Omega)$, a satisfactory inertial measurement unit often can be realized without the use of signal estimators that operate in accordance with FIG. 6 in the specific force channel 20.

In any case, signal processor 10 of FIG. 1 includes a processor signal source 22, which provides additional input signals to angular rate channel 18 (and in the event that specific force channel 20 utilizes signal estimators, to specific force channel 20). As is indicated in FIG. 1, angular rate channel 18 supplies a set of signals $\Omega_j$, where j represents each of the angular rate components supplied by the system (three in a standard inertial measurement unit) and specific force channel 20 supplies a set of specific force components, $f_j$.

Figure 2:
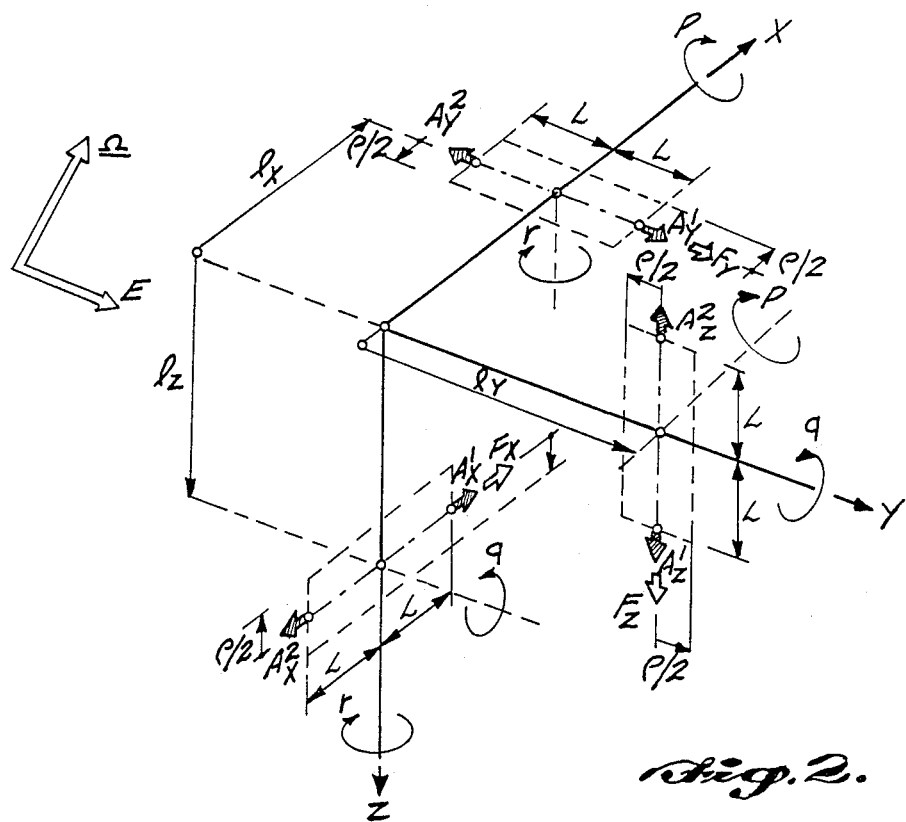
FIG. 2 is a diagram that is useful in understanding the nature of the signals processed by the embodiments of the invention that are disclosed herein.

Both the operation and structure of a signal processor constructed in accordance with this invention can be understood by considering the nature of the signals supplied to the signal processor $A(\Omega)$ and $A(f)$ in FIG. 1. In this regard, FIG. 2 illustrates one mechanization of a triad of paired accelerometers of the type described in the reference patent application for supplying a set of six signals that can be processed to determine the specific force components ($F_x$, $F_y$, $F_z$) and the angular rate components (p, q, r) of the object that contains or carries the accelerometer arrangement. In the arrangement of FIG. 2 each pair of accelerometers is mounted to measure specific force along an associated coordinate axis of the depicted right hand Cartesian coordinate system with the accelerometers being identified in FIG. 2 by vectors $A_i^j$, where the vectors correspond to the force sensing axis of the accelerometer and where the subscript "i" designates the coordinate axis along which specific force is measured and the superscript "j" (1 or 2) designates whether the associated accelerometer is the first or second member of an accelerometer pair. Further, as is shown in FIG. 2, the accelerometer of each pair of accelerometers are arranged "back-to-back" (i.e., so that the accelerometers sense specific force relative to opposite coordinate directions).

As is indicated in FIG. 2, each accelerometer pair cyclically vibrates (oscillates) in a coordinate plane that includes the coordinate axis with which the specific force vectors of the accelerometer pair are aligned (i.e., the accelerometer pair $A_x^1$, $A_x^2$ vibrates in the X-Z plane; the accelerometer pair $A_y^1$, $A_y^2$ vibrates in the X-Y plane; and the accelerometer pair $A_z^1$, $A_z^2$ vibrates in the Y-Z plane). As also is illustrated in FIG. 2, each accelerometer of the depicted mechanization is spaced apart from the second axis of the coordinate plane in which it oscillates (the axis that is not aligned with the accelerometer force sensing axis) by a distance L, with a line that is coincident with the force sensing axis of each accelerometer pair being orthogonal to and intersecting the second axis at a point defined by the oscillatory movement of the accelerometer pair. In the situation depicted in FIG. 2 and disclosed in the referenced patent application, the point of intersection can be expressed as:

$$l_i^j(t) = l_i - (-1)^j (\rho/2) \sin \omega t$$

where i denotes the axis of intersection (X, Y, or Z); $l_i^j$ denotes the distance between the origin of the coordinate system and the center of oscillation and $(\rho/2) \sin \omega t$ defines the oscillatory movement of the accelerometer.

Thus, the instantaneous position of each accelerometer of FIG. 2 (e.g., the center of mass of the accelerometer proof mass) relative to the depicted coordinate system is a vector $r_A^j$ and can be expressed by the following matrix equation:

$$\begin{bmatrix} r^1_{Ax} \\ r^2_{Ax} \\ r^1_{Ay} \\ r^2_{Ay} \\ r^1_{Az} \\ r^2_{Az} \end{bmatrix} = \begin{bmatrix} L & 0 & l_z + (\rho/2)\text{Sin}\omega t \\ -L & 0 & l_z - (\rho/2)\text{Sin}\omega t \\ l_x + (\rho/2)\text{Sin}\omega t & L & 0 \\ l_x - (\rho/2)\text{Sin}\omega t & -L & 0 \\ 0 & l_y + (\rho/2)\text{Sin}\omega t & L \\ 0 & l_y - (\rho/2)\text{Sin}\omega t & -L \end{bmatrix} \begin{bmatrix} i \\ j \\ k \end{bmatrix} \quad (1)$$

where i, j, and k denote unit vectors along the X, Y, and Z axes, respectively.

The general equation for the acceleration of a point mass in a rotating system is $$a = F + \dot{\Omega} \times r + 2\Omega \times \frac{dr}{dt}\bigg|_b + \Omega \times (\Omega \times r) + \frac{d^2r}{dt^2}\bigg|_b \quad (2)$$

where $\Omega$ is a vector that describes the angular rate of the system, F is the specific force vector, r is the instantaneous distance of the point mass from the center of rotation of the system and the index b indicates differentiation with respect to the rotating body axes.

By substituting Equation 1 into Equation 2 it can be shown that the acceleration experienced by each accelerometer in the mechanization of FIG. 2 is $$a_x^1 = F_x + l_z(pr + \dot{q}) + \frac{\rho}{2}(pr + \dot{q})\text{Sin}\omega t + \quad (3)$$

$$\left(2\omega\frac{\rho}{2}\text{Cos}\omega t\right) \cdot q - L(q^2 + r^2)$$

$$a_x^2 = -F_x - l_z(pr + \dot{q}) + \frac{\rho}{2}(pr + \dot{q})\text{Sin}\omega t +$$

$$\left(2\omega\frac{\rho}{2}\text{Cos}\omega t\right) \cdot q - L(q^2 + r^2)$$

$$a_y^1 = F_y - l_x(pq + \dot{r}) + \frac{\rho}{2}(pq + \dot{r})\text{Sin}\omega t +$$

$$\left(2\omega\frac{\rho}{2}\text{Cos}\omega t\right) \cdot r - L(p^2 + r^2)$$

$$a_y^2 = -F_y - l_x(pq + \dot{r}) + \frac{\rho}{2}(pq + \dot{r})\text{Sin}\omega t +$$

$$\left(2\omega\frac{\rho}{2}\text{Cos}\omega t\right) \cdot r - L(p^2 + r^2)$$

$$a_z^1 = F_z - l_y(qr + \dot{p}) + \frac{\rho}{2}(qr + \dot{p})\text{Sin}\omega t +$$

$$\left(2\omega\frac{\rho}{2}\text{Cos}\omega t\right) \cdot p - L(p^2 + q^2)$$

$$a_z^2 = -F_z - l_y(qr + \dot{p}) + \frac{\rho}{2}(qr + \dot{p})\text{Sin}\omega t +$$

$$\left(2\omega\frac{\rho}{2}\text{Cos}\omega t\right) \cdot p - L(p^2 + q^2)$$

In accordance with the teachings of the referenced patent application, the accelerations for each pair of accelerometers are added and subtracted to obtain equations that express the specific force for the associate coordinate direction and the angular rate for an orthogonal coodinate direction. More specifically, when the accelerations for each pair of accelerometers in the mechanization of FIG. 2 are added (e.g., in preprocessor 16 of FIG. 1) the following expressions are obtained:

$$a_x^q = \rho(pr + \dot{q})\text{Sin } \omega t + 2\omega\rho q \text{ Cos } \omega t - 2L(q^2 + r^2) \quad (4)$$

$$a_y^r = \rho(pq + \dot{r})\text{Sin } \omega t + 2\omega\rho r \text{ Cos } \omega t - 2L(p^2 + r^2) \quad (5)$$

$$a_z^p = \rho(qr + \dot{p})\text{Sin } \omega t + 2\omega\rho p \text{ Cos } \omega t - 2L(p^2 + q^2) \quad (6)$$

where $a_x^q = a_x^1 + a_x^2$; $a_y^r = a_y^1 + a_y^2$; and $a_z^p = a_z^1 + a_z^2$ and when the accelerations of the accelerometer pairs in the mechanization of FIG. 2 are subtracted the following expressions are obtained:

$$a_x^{Fx} = 2F_x + l_z(pr + q) \quad (7)$$

$$a_y^{Fy} = 2F_y + l_x(pq + r) \quad (8)$$

$$a_z^{Fz} = 2F_z + l_y(qr + p) \quad (9)$$

where $a_x^{Fx} = a_x^1 - a_x^2$; $a_y^{Fy} = a_y^1 - a_y^2$; and $a_z^{Fz} = a_z^1 - a_z^2$ Thus, in an ideal, noise-free system, the specific force vector F is a column vector that includes the elements $F_x$, $F_y$ and $F_z$ and the angular rate vector $\Omega$ that includes the elements p, q and r (where p, q, and r respectively denote right hand rotation about the X, Y and Z axes) can be obtained from Equations 4–9. In this regard, the specific force components can be obtained by operating on Equations 7–9 in a manner that eliminates each right hand term of the equation and the angular rate information can be determined by operating on Equations 4–6 to eliminate all but the second term of each equation. For example, to obtain the q component of angular rate, it is necessary to eliminate the first and last term of Equation 4 (which represent acceleration terms due to acceleration about the Y-coordinate axis, the cross product of angular velocity about the X and Z axes and centrifugal acceleration). Once the middle term of Equation 4 is determined, q can be readily obtained since the quantities $\omega$ and $\rho$ respectively describe accelerometer oscillation frequency and amplitude and, thus, are known.

In utilizing paired accelerometer arrangements of the above-described type in practical applications such as a strapdown inertial navigation system, it is necessary to consider several sources of error, including:

(1) mechanical misalignment of the accelerometers relative to the coordinate axes (e.g., angular misalignment between the colinear force sensitive axes of each accelerometer pair and the associated coordinate axes);

(2) the phase angle between the signal that vibrates the accelerometer pairs (e.g., the signals supplied by accelerometer drive circuit 14 of FIG. 1) and the output signals provided by the accelerometers (i.e., phase shift);

(3) wideband noise resulting from both the accelerometers and vibration of the vehicle that contains or carries the accelerometers; and, (4) low frequency signal drift of each accelerometer pair.

When these considerations are taken into account, it can be shown that Equation 4 can be expressed as:

$$a_x^q = \rho \sin(\omega t + \phi)(pr + \dot{q}) + 2\omega \rho q \cos(\omega t + \phi) - 2L(q^2 + r^2) + \rho a \omega^2 \sin(\omega t + \phi) + n + d \quad (10)$$

where $\phi$ denotes the phase shift between the signal source that oscillates the accelerometers (e.g., accelerometer drive circuit 14 of FIG. 1) and the sum of the output signals provided by accelerometer $A_x^1$ and $A_x^2$ of FIG. 2; $\alpha$ represents the angular misalignment between the force sensitive axis of accelerometer pair and the X axis of the coordinate system of FIG. 2; n represents the wideband noise introduced by the accelerometer assembly and vibration of vehicle carrying the accelerometer assembly; and d represents low frequency signal drift of the sum of the signals produced by the accelerometer pair (provided by preprocessor 16 of FIG. 1). Expressions of identical form can be obtained for Equations 5 and 6.

Rearranging Equation 10 to organize the equation in terms of an in-phase component (Cos $\omega$t), a quadrature term (Sin $\omega$t) and a constant term yields:

$$a_x^q = [2\omega \rho q \cos\phi + \rho a \omega^2 \sin\phi + \rho(pr+\dot{q})\sin\phi]\cos\omega t + [\rho(pr+\dot{q})\cos\phi + \rho a \omega^2 \cos\phi - 2\rho\omega q \sin\phi]\sin\omega t - 2L(q^2+r^2) + n + d \quad (11)$$

Since the phase angle $\phi$ is normally small Sin $\phi$ is approximately equal to $\phi$. Making this substitution in Equation 11 and normalizing with respect to $2\omega\rho$ yields:

$$q_m = a_1 \cos\omega t + a_2 \sin\omega t + a_3 \quad (12)$$

where $$a_1 = q\cos\phi + \bar{\alpha}\omega\phi/2 + (\tfrac{1}{2}\omega)(pr+q)\phi \quad (13)$$

$$a_2 = (\tfrac{1}{2}\omega)(pr+\dot{q})\cos\phi + (\alpha\omega/2)\cos\phi - q\phi \quad (14)$$

$$a_3 = -(L/\omega\rho)(q^2+r^2) + \delta + \nu \quad (15)$$

where $\delta = d/2\omega\rho$ and $\nu = n/2\omega\rho$.

In view of Equations 12 and Equations 13-15 it could be recognized that the term $a_1$ is an in-phase term that contains the angular rate to be determined, q; $a_2$ is a quadrature term and $a_3$ is a random, unmodulated additive noise term. More specifically, it can be recognized that the angular rate component q can readily be determined from the q Cos $\phi$ component of $a_1$; the $\alpha\omega\phi/2$ component of $a_1$ is substantially a constant bias term that is determined both by accelerometer misalignment and the phase shift between the signal source that drives the accelerometers and the output signal provided by the accelerometers; and the component $(pr+\dot{q})\cos\phi/2\omega$ represents random noise that is dependent on random angular vibration of the coordinate system in FIG. 2 (i.e., angular vibration of the object containing or carrying the accelerometer arrangement). In $a_2$, the component $(\tfrac{1}{2}\omega)(pr+q) \cos\phi$ represents random noise that is dependent on random angular vibration of the coordinate system; $\alpha\omega \cos\phi/2$ is a bias term resulting from the same source as the bias term of $a_1$; and $q\phi$ is a random signal that depends on angular vibration of the coordinate system (i.e., angular vibration of the accelerometer assembly).

The underlying mathematical principles of the invention shall now be explained. In particular, the invention is based on adaptive least mean squared estimation in which each signal that is processed to obtain an angular rate component or a specific force component is estimated; the estimate is subtracted from the actual signal to form an error signal and the error signal is processed in a manner that improves the estimate so that the error signal approaches zero. With respect to the signal that is to be processed to provide the q component of angular rate (Equation 12), the signal estimate can be expressed as $$\hat{q}_m = \hat{a}_1 \cos\omega t + \hat{a}_2 \sin\omega t + \hat{a}_3$$

where $\hat{a}_1$, $\hat{a}_2$ and $\hat{a}_3$ are the estimated values of $a_1$, $a_2$ and $a_3$, respectively. The error signal can thus be defined as $$e = q_m - \hat{q}_m = a_1 \cos\omega t + a_2 \sin\omega t + a_3 - \hat{a}_1 \cos\omega t - \hat{a}_2 \sin\omega t - \hat{a}_3 \quad (16)$$

Defining $J = e^2$ to obtain a nonnegative function and applying the gradient algorithm $$K \frac{\partial J}{\partial \hat{a}} = -\frac{d\hat{a}}{dt} \quad (17)$$

Where $\underline{a}$ represents a column vector consisting of $a_1$, $a_2$ and $a_3$ and K is a constant diagonal matrix that includes the elements $k_1$, $k_2$ and $k_3$. Rewriting Equation 17 as a series of equations yields $$k_1 \frac{\partial e^2}{\partial \hat{a}_1} = k_1 e \frac{\partial e}{\partial \hat{a}_1} = -\frac{d\hat{a}_1}{dt} \quad (18)$$

$$k_2 \frac{\partial e^2}{\partial \hat{a}_2} = k_2 e \frac{\partial e}{\partial \hat{a}_2} = -\frac{d\hat{a}_2}{dt} \quad (19)$$

$$k_3 \frac{\partial e^2}{\partial \hat{a}_3} = k_3 e \frac{\partial e}{\partial \hat{a}_3} = -\frac{d\hat{a}_3}{dt} \quad (20)$$

Using the definition of e in Equation 16, Equations 18-20 become $$\frac{\partial e}{\partial \hat{a}_1} = -\cos\omega t \quad (21)$$

$$\frac{\partial e}{\partial \hat{a}_2} = -\sin\omega t \quad (22)$$

$$\frac{\partial e}{\partial \hat{a}_3} = -1 \quad (23)$$

By substituting Equations 21-23 into Equations 18-20, the following time varying linear differential matrix equation is obtained $$\dot{\hat{a}} + KA(t)\hat{a} = KA(t)a \quad (24)$$

where: $\hat{a} = [\hat{a}_1, \hat{a}_2, \hat{a}_3]^T$ $$a = [a_1, a_2, a_3]^T$$

$$\dot{a} = \frac{d\hat{a}}{dt}$$

$$A(t) = \begin{bmatrix} \cos^2\omega t & \cos\omega t \sin\omega t & \cos\omega t \\ \cos\omega t \sin\omega t & \sin^2\omega t & \sin\omega t \\ \cos\omega t & \sin\omega t & 1 \end{bmatrix}$$

and T denotes the matrix transpose operation. In Equation 24, a is the state variable to be solved (in order to obtain the angular rate component, q) and a is the forcing function (the signal to be processed), which includes noise as part of the $a_3$ component.

Since the determinant of A(t) is nonnegative for each instant of time and, on the average, A(t) is positive definite, the solution for â is stable under all conditions (globally stable). Thus, if $\nu$ is zero (noise free solution), as the stable solution for â is reached, ȧ goes to zero and the limit of â (as time goes to infinity) is a.

Thus, it can be seen that, in the absence of noise, the estimate â is identical to a and, further, when noise ($\nu$) is present, â is the best least mean square estimate of a.

In view of Equation 24 it can be recognized that the value of K (i.e., the values of $k_1$, $k_2$ and $k_3$) both determines the rate at which â converges to a and determines the magnitude of the system noise. Since the convergence rate (and, hence, the ability of the signal estimation to track changes in the angular rate) increases with increasing values of K, and since noise also increases with increasing values of K (which can affect the accuracy of estimation), it is necessary to establish the values of K so as to provide a satisfactory compromise between system tracking and accuracy. In addition, since the off diagonal terms of A(t) are non-zero, it can be recognized that the estimates $\hat{a}_1$, $\hat{a}_2$ and $\hat{a}_3$ are not completely independent of one another, but include modulated coupling terms. For example, the first equation that is expressed by the solution matrix Equation 24 can be written as $$\dot{\hat{a}}_1 + k_1 \cos^2\omega t\, \hat{a}_1 = k_1 \cos^2\omega t\, a_1 + k_1 \cos\omega t \sin\omega t (a_2 - \hat{a}_2) + k_1 \cos\omega t (a_3 - \hat{a}_3) \quad (25)$$

in which the coupling terms $k_1 \cos\omega t \sin\omega t (a_2 - \hat{a}_2)$ and $k_1 \cos\omega t (a_3 - \hat{a}_3)$ vanish as the estimates $\hat{a}_2$ and $\hat{a}_3$ become equal to the actual values of $a_2$ and $a_3$ (i.e., vanish as a signal processor that implements the above discussed signal estimation reaches steady state). In addition, in the steady state, $\dot{\hat{a}}_1$ goes to zero and the $k_1 \cos^2\omega t$ terms on the right and left side of the equation cancel. Thus, the steady state solution for $a_1$, (and, hence, angular rate q) is a constant value (e.g., is "ripple-free").

Figure 3:
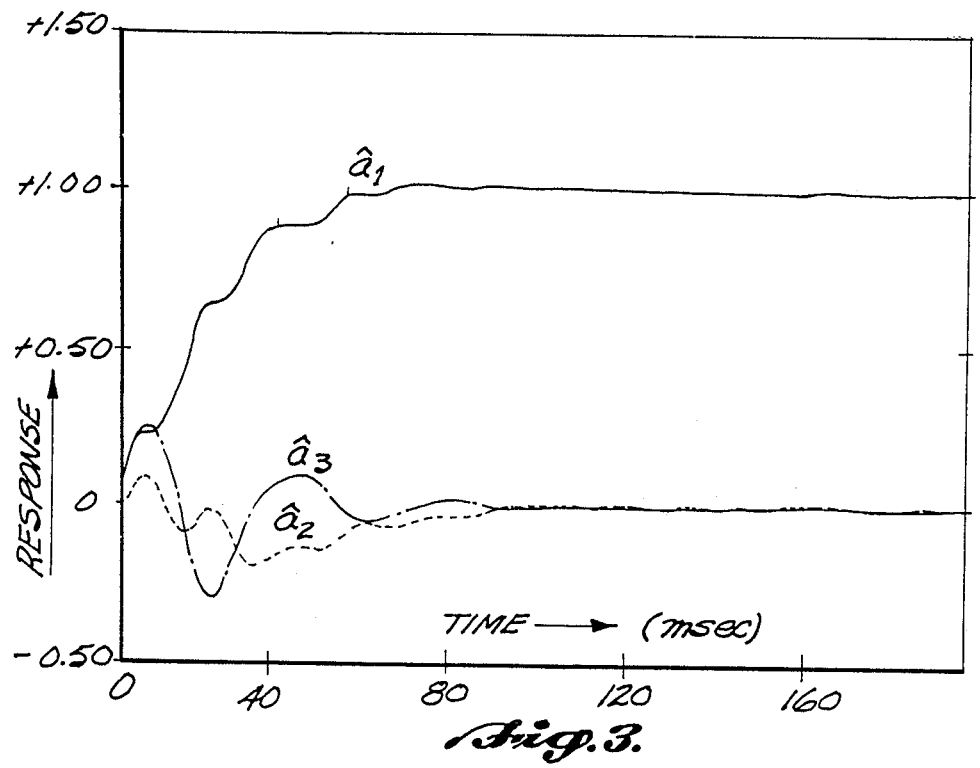
FIGS. 3 through 5 depict the response of a signal processor that is configured in accordance with this invention relative to application of an abrupt change in the estimated signals, thus being useful in understanding various advantages and attributes of the invention.
Figure 4:
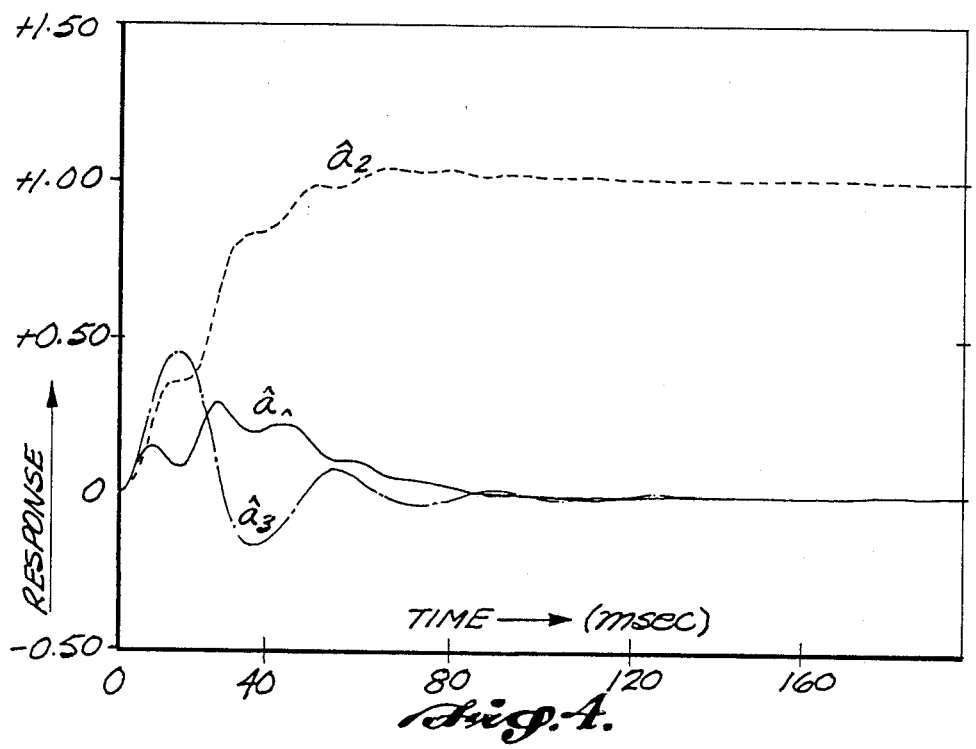
Figure 5:
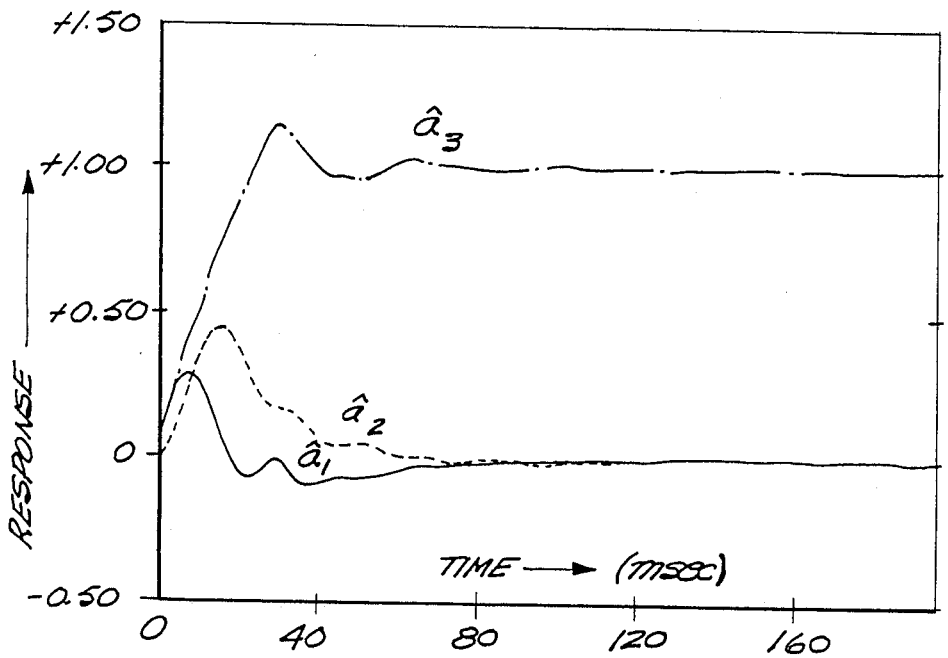

Although the analytical solution for the estimates $\hat{a}_1$, $\hat{a}_2$ and $\hat{a}_3$ are relatively complex when the coupling terms are included, it can be demonstrated that the above-discussed estimation provides a satisfactory basis for processing the signals supplied by oscillating or vibrating accelerometer arrangements in precision nongyroscopic inertial navigation systems. In this regard, FIGS. 3, 4 and 5 illustrate the results of a computer simulation of the estimation of $\hat{a}_1$, $\hat{a}_2$ and $\hat{a}_3$ when $a_1$, $a_2$ and $a_3$ are unit step functions (i.e., $a_1=1$, for $t>0$ $a_1=0$ for $t<0$; etc.). More specifically, FIG. 3 illustrates the estimation response for a unit step in $a_1$; FIG. 4 illustrates estimation response for a unit step in $a_2$; and FIG. 5 illustrates estimation response for a unit step in $a_3$. In each of the FIGS. 3 through 5, $\omega$ is 200 radians/second and $k_1=k_2=k_3=100$.

Several characteristics of the estimation process utilized in accordance with the invention that are analytically presented in the preceding paragraphs can be ascertained from FIGS. 3 through 5. Firstly, the estimates $\hat{a}_1$, $\hat{a}_2$ and $\hat{a}_3$ rapidly converge to $a_1$, $a_2$ and $a_3$, with convergence occurring in FIGS. 3 through 5 in approximately 40 milliseconds. Secondly, each estimate is ripple free (constant) after the estimation process reaches steady state. Thirdly, the effect of the previously discussed coupling (e.g., the $(a_2 - \hat{a}_2)$ and $(a_3 - \hat{a}_3)$ terms in Equation 25) is of a transient nature and there is no effect when the estimates $\hat{a}_1$, $\hat{a}_2$ and $\hat{a}_3$ converge to $a_1$, $a_2$ and $a_3$. Fourthly, even when relatively high gains are employed in each estimation ($k_1=k_2=k_3=100$ in FIGS. 3 through 5), the resulting disturbance in the signal estimates is relatively small and well behaved.

With respect to establishing the values of $k_1$, $k_2$ and $k_3$, it should be noted that when the signal estimation is utilized in inertial navigation systems only the component that is being processed to obtain an angular rate component (or specific force component) changes significantly during time intervals of less than several seconds. For example, in the exemplary situation being considered wherein the signal $a_x^q$ (expressed in Equation 11) is processed to obtain the q angular rate component, only $a_1$ will vary significantly within time intervals less than several seconds. Thus, if the gain for the signal estimate that contains the desired angular rate or specific force is set at a value higher than the gain value for the two other signal estimates, coupling between the estimates can be reduced even further.

As was mentioned with respect to FIGS. 3 through 5, the signal estimates $\hat{a}_1$, $\hat{a}_2$ and $\hat{a}_3$ rapidly converge to a $a_1$, $a_2$ and $a_3$. The time constant of convergence can be determined by setting the coupling terms of Equation 25 to zero, which results in the following first order differential equation in $\hat{a}_1$, with $a_1$ being the forcing function:

$$\dot{\hat{a}}_1 + (k_1/2)\hat{a}_1 = (k_1/2)a_1 \quad (26)$$

expressed in the frequency domain, the solution of Equation 26 is $$\hat{a}_1(s) = \frac{k_1/2}{s + k_1/2} a_1(s) \quad (27)$$

where s represents the Laplacian operator. Thus, the approximate time constant for convergence of $\hat{a}_1$ to $a_1$ is $\tau = 2/k_1$.

Figure 6:
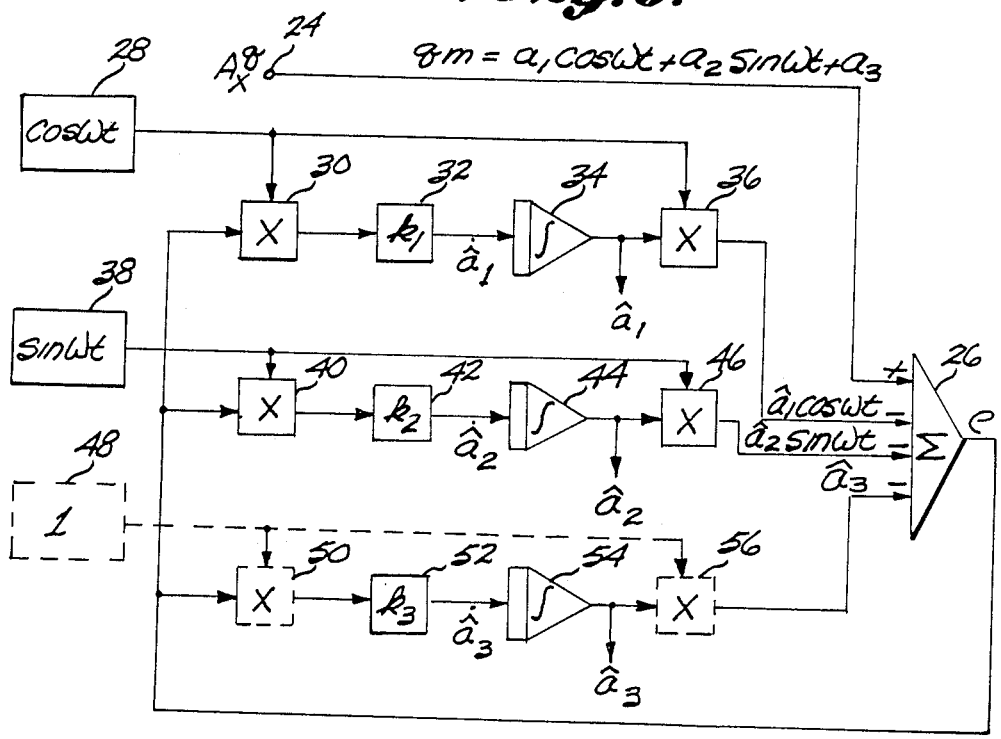
FIG. 6 is a block diagram that schematically depicts the signal processor of this invention, as embodied for supplying a signal representative of the inertial angular rate for one axis of the coordinate system associated with an inertial measurement unit.

FIG. 6 depicts an analog circuit realization of the invention for processing the previously discussed signal (Equation 12) to obtain the angular rate component q. It will be recognized by those skilled in the art that the angular rate components p and r can be obtained by two additional circuit arrangements of the type depicted in FIG. 6 with p being obtained by processing the signal $a_z^1 + a_z^2$ and r being obtained by processing the signal $a_y^1 + a_y^2$.

The circuit arrangement shown in FIG. 6 can be understood by noting that the signal processing error defined by Equation 16 can be expressed as $$e = (a_1 - \hat{a}_1) \cos\omega t + (a_2 - \hat{a}_2) \sin\omega t + (a_3 - \hat{a}_3) \quad (28)$$

Expressing Equations 18-20 in integral form yields $$\hat{a}_j = -k_j \int e \frac{\partial e}{\partial \hat{a}_j} dt \quad (29)$$

where j=1, 2, 3. Substituting Equations 21-23 into Equation 29 yields $$\hat{a}_1 = k_1 \int e \cos\omega t \, dt \quad (30)$$

$$\hat{a}_2 = k_2 \int e \sin\omega t \, dt \quad (31)$$

$$\hat{a}_3 = k_3 \int e \, dt \quad (32)$$

Thus, in the arrangement of FIG. 6, the signal being processed ($q_m$ in FIG. 6) is supplied to a terminal 24, which is connected to an additive input of a signal summing unit 26. Coupled to subtractive input terminals of signal summing unit 26 are signals $\hat{a}_1 \cos \omega t$; $\hat{a}_2 \sin \omega t$; and $\hat{a}_3$ so that signal summer 26 provides the specified error signal, e (Equation 28). To provide a signal $\hat{a}_1$ of the form defined by Equation 30, a signal source 28 that is synchronized to the signal that drives the accelerometers from which $q_m$ is obtained supplies a signal $\cos \omega t$ to one input terminal of a multiplier circuit 30, which has the second input terminal thereof connected for receiving the error signal, e, from signal summing unit 26. A gain unit 32 scales the signal supplied by multiplier circuit 30 by the factor $k_1$ and supplies the scaled signal to the input of an integrator circuit 34. A multiplier circuit 36 receives the signal supplied by integrator circuit 34 and the $\cos \omega t$ signal supplied by signal source 28 to thereby provide the signal $\hat{a}_1 \cos \omega t$ to one of the subtractive input terminals of signal summing unit 26.

As is shown in FIG. 6, the signal $\hat{a}_2 \sin \omega t$ is derived in a manner similar to $\hat{a}_1 \cos \omega t$. That is, a signal source 38 that is synchronized to the signal that drives accelerometers from which $q_m$ (and, hence, is in phase quadrature with signal source 28) supplies a signal $\sin \omega t$ to a multiplier circuit 40 and a multiplier circuit 46. The error signal, e, is connected to the second input terminal of multiplier circuit 40 with the output of multiplier circuit 40 being scaled by a factor $k_2$ in gain unit 42. The scaled signal is then integrated by integrator circuit 44 with the output signal of integrator circuit 44 being coupled to the second input terminal of multiplier 46.

The signal estimate $\hat{a}_3$ is obtained in a similar manner. In the arrangement of FIG. 6, a dc signal source supplies a signal (1) to multiplier circuits 50 and 56. The error signal supplied by summing unit 26 is connected to the second input terminal of multiplier circuit 50 and the signal supplied by multiplier 50 is scaled by the factor $k_3$ in gain unit 52. The scaled signal is integrated in integrator circuit 54 and supplied to the second input of multiplier circuit 56, which supplies the signal estimate $\hat{a}_3$ to a subtractive input terminal of signal summing unit 26.

It will be recognized that signal source 48 and multipliers 50 and 56 are not required in analog circuit realizations of the type depicted in FIG. 6, since the required multiplication factor for the portion of the circuit that produces $\hat{a}_3$ is unity. However, these elements have been included in FIG. 6 to illustrate that fact that identical circuit topology (and, hence, identical form of signal processing) can be utilized to supply the signal estimates $\hat{a}_1$, $\hat{a}_2$, and $\hat{a}_3$. In this regard, it can be recognized that the signal processing effected by the analog arrangement of FIG. 6 and analytically described in the previous paragraphs easily can be implemented in digital circuit form. For example, in many situations it may be advantageous to use a conventional microprocessor circuit programmed to determine the signal estimates $\hat{a}_1$, $\hat{a}_2$, $\hat{a}_3$ and to determine the error signal, e, with the microprocessor at a rate on the order of 100 hertz. Since the necessary operations of multiplication and addition can be accomplished at a substantially higher rate than a 100 hertz operating rate, realtime solutions are readily obtained through the use of conventional microprocessor programming techniques.

In any case, the signal estimate $\hat{a}_1$ obtained through the practice of the invention yields the desired angular rate component. With respect to processing the signal $q_m$ to obtain the angular rate q it can be recalled from Equation 13 that $$a_1 = q \cos \phi + a\omega\phi/2 + (\tfrac{1}{2}\omega)(pr+\dot{q})\phi$$

In inertial navigation systems that employ the invention, the accelerometer pairs that supply the signals to be processed are mechanically aligned with the axes of the accelerometer assembly coordinate system to maintain $\alpha = 0$. Further, a phase shifter that can be adjusted to establish $\phi \approx 0$ typically is included in the accelerometer assembly (e.g., accelerometer assembly 12 of FIG. 1) or in an associated electronic unit (e.g., accelerometer drive circuit 14 of FIG. 1). When these conditions are met, the invention (e.g., integrator 34 of FIG. 6) provides a signal $\hat{a}_1$ that can be scaled by the factor $\tfrac{1}{2}\omega\rho$ to precisely measure the desired angular rate component (e.g., q).

The present invention is especially advantageous in that the signal estimates $\hat{a}_1$, $\hat{a}_2$ and $\hat{a}_3$ can be used for calibrating the inertial measurement unit of the type depicted in FIG. 1 to minimize the previously discussed phase shift error $\phi$ and the accelerometer misalignment error $\alpha$. In particular, since the phase shift error $\phi$ is relatively small $\cos \phi$ is approximately equal to one and when accelerometer assembly 12 of FIG. 1 is held motionless, the signal components $a_1$, $a_2$ and $a_3$ of Equation 13-15 essentially reduce to $$a_1 = a\omega\phi/2;$$

$$a_2 = a\omega/2; \text{ and,}$$

$$a_3 = d/2\omega\rho$$

Since, in the steady state condition $a_1$, $a_2$ and $a_3$ are substantially equal to $\hat{a}_1$, $\hat{a}_2$ and $\hat{a}_3$, the signal estimates provided by the FIG. 6 (or an equivalent realization of the invention, can be utilized to correct both the alignment of the associated accelerometer pair and the phase of the signal that drives the accelerometer pair. In particular, by providing for mechanical adjustment that aligns the accelerometer pair that provides the signal being processed with the associated axis of the accelerometer assembly (the X axis for the signal that is processed to obtain the angular rate component q) and holding the accelerometer assembly motionless, mechanical alignment ($\alpha \approx 0$) can be attained by monitoring the signal estimate $\hat{a}_2$ and adjusting the alignment mechanism so that $\hat{a}_2$ is equal to zero. To eliminate the phase shift error $\phi$, a constant calibrated input q is applied (by rotating the accelerometer assembly in a controlled manner about the Y coordinate axis) and the value of $\hat{a}_2$ is determined. As can be seen from Equation 14, with a q constant, any deviation of $\hat{a}_2$ from zero results from a nonzero value for the quantity $q\phi$. Thus, adjusting the phase of the signal supplied to the accelerometer pair by accelerometer drive circuit 14 so that $\hat{a}_2$ equal zero eliminates the phase shift $\phi$.

Although the operation of the circuit depicted in FIG. 6 is described fully by Equations 28-31, additional understanding can be obtained by considering the manner in which the circuit operates when one or more of the signal estimates do not correspond to the related signal components. For example, assume that $\hat{a}_1$ is less than $a_1$. When this condition occurs, the error signal e supplied by signal summing unit 26 will contain a component of the form $(a_1 - \hat{a}_1)$ Cos $\omega t$. When this component is multiplied by Cos $\omega t$ (in multiplier circuit 30) and scaled by the factor $k_1$ (in scaling circuit 32), a signal of the form $$k_1 \text{Cos}^2 \omega t \, (a_1 - \hat{a}_1)$$

is supplied to the input of integrator 34. Since this signal has a dc value of $(k_1/2)(a_1 - \hat{a}_1)$, integrator 34 provides a signal that increases uniformly with time (a ramp signal). Thus, the estimate $\hat{a}_1$ is caused to increase, which, in turn, increase the signal $\hat{a}_1$ Cos $\omega t$ and decreases the error component $(a_1 - \hat{a}_1)$. Since the error signal e is continuously fed back through the circuitry of FIG. 6, the process continues until $\hat{a}_1 = a_1$ (or until the input signal $q_m$ changes in a manner that alters $a_1$). Operation of the circuit of FIG. 6 so that the signal estimates $\hat{a}_2$ and $\hat{a}_3$ are continously matched to the signal components $a_2$ and $a_3$ is directly analogous to the circuit operation that causes $\hat{a}_1$ to be continously matched to the input component $a_1$.

In view of the above-discussed operation of the circuit of FIG. 6, it can be noted that the signal estimates will contain some ripple components whenever an error signal is supplied by summing circuit 26. In particular, in the above discussed situation in which $\hat{a}_1$ is less than $a_1$, the signal $(a_1 - \hat{a}_1)$ Cos$^2 \omega t$ contains components of the form $[(a_1 - \hat{a}_1)/2]$ Cos $2\omega t$, which cause ripple in the signal estimate at the frequency $2\omega$. However, since the integral of this signal over each half cycle is zero, there is no net effect on the signal estimate. Similarly, if $\hat{a}_2$ is not equal to $a_2$ at the same time that $\hat{a}_1$ is not equal to $a_1$, the error signal supplied by summing circuit 26 will include a component of the form $(a_2 - \hat{a}_2)$ Sin $\omega t$. This signal appears at the input terminal of integrator 34 as a signal of the form $k_1 (a_2 - \hat{a}_2)/2$ Sin$^2 \omega t$. Since the integral of this signal over any half cycle is zero, additional ripple at the frequency $2\omega$ results, but there is no net effect on the estimate $\hat{a}_1$. As was demonstrated by to FIGS. 3 through 5, when the signal estimates closely track the associated signal components, the ripple caused by the above-discussed signal coupling is relatively small and is eliminated as the signal estimation process reaches steady state.

The noise characteristics of the signal processing of this invention can be basically understood by considering a noise model based on Equation 25. In particular, a low frequency noise model can be obtained from Equation 25 by examining the case in which the only input is the noise component $a_3$:

$$\dot{\hat{a}}_1 + k_1 \text{Cos}^2 \omega t \, \hat{a}_1 = k_1 \text{Cos } \omega t (a_3 - \hat{a}_3) \qquad (33)$$

For the low frequency components of $a_3$, the modulation components of Equation 33 may be averaged over several cycles. The average value of Cos$^2 \omega t$ is $\frac{1}{2}$; the average effect of Cos $\omega t$ is multiplication of the derivative of $(a_3 - \hat{a}_3)$ by $1/\omega$; and the low frequency relationship between $a_3$ and $\hat{a}_3$ may be obtained in an exactly analogous fashion to Equations 26 and 27 for $a_1$. Combining these relationships in the frequency domain results in:

$$\widetilde{a_1}(s) = \hat{a}_1(s) \approx (k_1/(s+k_1/2))(s/\omega)(\hat{a}_3(s) - a_3(s)) \approx k_1 \cdot s^2 a_3(s)/\omega[(s+k_1/2)^2] \qquad (34)$$

Thus, it can be recognized any noise source that exhibits a finite power spectrum density at zero frequency will produce a noise output whose time integral has zero power spectrum at zero frequency and thus will exhibit very low noise under the conditions typically encountered in an inertial navigation system.

It can be noted however, that the signal processing of the invention may exhibit noise rectification that results in an error component in the desired signal estimate (e.g., $\hat{a}_1$). In particular, rectification will occur for noise of the form $$\nu(t) = \nu_o \text{ Cos } (m\omega t); \text{ where } m = 1, 2, \ldots \qquad (35)$$

For example, when $m = 1$, Equation 33 becomes $$\dot{\hat{a}}_1 + k_1 \text{Cos}^2 \omega t \, \hat{a}_1 = k_1 \nu_o \text{ Cos}^2 \omega t \qquad (36)$$

Approximating $k_1$ Cos$^2 \omega t$ by $k_1/2$, yields $$\hat{a}_1(s) = [(k_1 2)/(s + k_1 2)]\nu_o \qquad (37)$$

Which, for relatively high frequencies, becomes substantially equal to $\nu_0$. Those familiar with angular rate sensors that utilize Coriolis acceleration to measure angular rate will recognize that this type of retification error is common to such sensors. As is known in the art, the most effective method to reduce the rectification error is to establish the oscillation frequency $\omega$ substantially above the cut off frequency of the shock mounts that suspend and support the accelerometers of the angular rate sensor system (e.g., the shock mounts that suspend the accelerometer pairs within accelerometer assembly 12 of FIG. 1).

Another type of noise that is important in inertial angular measurement units that are utilized in inertial navigation systems is noise that results from high frequency angular vibration. For example, with respect to the above-described process for determining the angular rate of q, vibration of accelerometer assembly 12 of FIG. 1 so that angular vibration about the q coordinate axis of FIG. 2 occurs will result in an additional noise component in the signal component $a_1$. The effect of such angular vibration on the signal processing that is effected in accordance with the invention can be determined by disregarding the coupling terms and noise term of Equation 25, which yields $$\dot{\hat{a}}_1 + k_1 \text{Cos}^2 \omega t \, \hat{a}_1 = k_1 \text{Cos}^2 \omega t \, a_1 \qquad (38)$$

Figure 7:
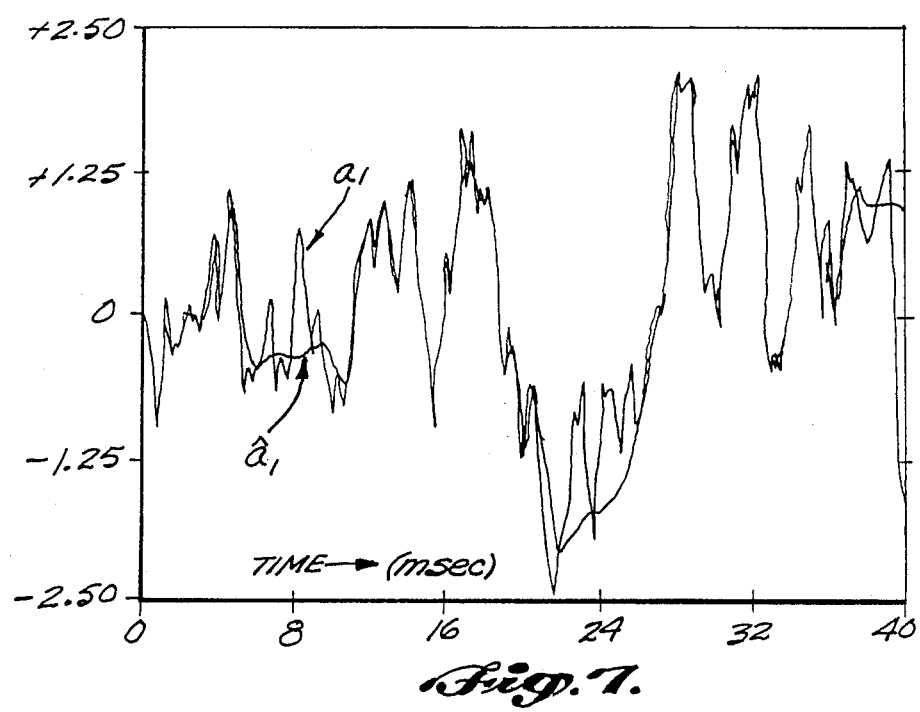
FIG. 7 is a signal diagram that illustrates the accuracy of the signal processor depicted in FIG. 6.

It can be noted that the right hand term of Equation 38 periodically becomes zero (at a frequency $2\omega$). Thus, the precise estimate of q is lost at isolated points in the time domain that are spaced apart by $\pi/\omega$. This means that the estimate of q that is provided by the signal processing method of the invention will periodically be in error by whatever noise is present because of angular vibrations. Although the mathematical analysis of the effect of random vibration is relatively complex, the situation can be understood in view of FIG. 7, which illustrates a computer simulation for randomly varying values of q with $\omega=200$ radians/second and $k_1=10,000$. In FIG. 7 it can be noted that the signal estimate $\hat{a}_1$ closely tracks (corresponds to) the signal component $a_1$ except at times that are separated by approximately 16 milliseconds ($T=\pi/\omega$).

In most embodiments in the invention, the effect of this type of noise on the accuracy of the angular rate being determined (q in the example being considered) can be held to an acceptable level by establishing the frequency at which the accelerometer pairs are oscillated substantially greater than the cutoff frequency of the shock mounts that suspends the accelerometer pairs. Moreover, in situations in which additional suppression of this type of error is desired or necessary, the accelerometer assembly (e.g., accelerometer assembly 12 of FIG. 1) and the signal processing of the invention can be adapted to a configuration that eliminates the singularities that occur in Equation 38.

More specifically, the singularities exhibited by Equation 38 and illustrated in FIG. 7 can be eliminated by mounting an additional pair of accelerometers on each coordinate axis of FIG. 2 (so that a triad of accelerometers includes six accelerometer pairs) with the added accelerometers being oscillated 90° out of phase with the existing accelerometers. The signals provided by each additional set of accelerometers are then added and subtracted in the previously discussed manner to provide a signal that can be processed to obtain one of the specific force components and a signal that could be processed to obtain one of the angular rate components. The signals to be processed for each angular rate component are then processed in the manner described above with respect to the signal processing for obtaining the angular rate component q, except that each Cos $\omega t$ term is replaced by Sin $\omega t$ and each Sin $\omega t$ term is replaced by $-\text{Cos }\omega t$ (to account for the 90° phase difference in the oscillation of the transducer pairs). Rewriting Equation (38) for the Cos $\omega t$—associated signal $\hat{a}_1{}^c$ and the Sin $\omega t$—associated signal $\hat{a}_1{}^s$ as well as the corresponding signals $\hat{a}_2{}^c$, $\hat{a}_2{}^s$, $\hat{a}_3{}^c$, $\hat{a}_3{}^s$, the derivatives with respect to time $\dot{\hat{a}}_1{}^c$, $\dot{\hat{a}}_1{}^s$, $\dot{\hat{a}}_2{}^c$, $\dot{\hat{a}}_2{}^s$, $\dot{\hat{a}}_3{}^c$, $\dot{\hat{a}}_3{}^s$ are:

$$\dot{\hat{a}}_1{}^c = k_1 \text{Cos}^2\omega t(a_1{}^c - \hat{a}_1{}^c); \quad \dot{\hat{a}}_1{}^s = k_1 \text{Sin}^2\omega t(a_1{}^s - \hat{a}_1{}^s)$$
$$\dot{\hat{a}}_1{}^c = k_2 \text{Sin}^2\omega t(a_2{}^c - \hat{a}_2{}^c); \quad \dot{\hat{a}}_2{}^s = k_2 \text{Cos}^2\omega t(a_2{}^s - \hat{a}_2{}^s) \quad (39)$$
$$\dot{\hat{a}}_3{}^c = \frac{k_3}{2}(a_3{}^c - \hat{a}_3{}^c); \quad \dot{\hat{a}}_3{}^s = \frac{k_3}{2}(a_3{}^s - \hat{a}_3{}^s)$$

The superscript "c" denotes that the associated signal estimate results from the original accelerometer pair (oscillated at frequency Cos $\omega t$) and the superscript "s" denotes that the associated signal estimate results from the added accelerometer pair (oscillated at frequency Sin $\omega t$).

By expressing the sums of these derivatives: $\dot{\hat{a}}_1=(\dot{\hat{a}}_1{}^c+\dot{\hat{a}}_1{}^s)/2$; $\dot{\hat{a}}_2=(\dot{\hat{a}}_2{}^c+\dot{\hat{a}}_2{}^s)/2$; $\dot{\hat{a}}_3=(\dot{\hat{a}}_3{}^c+\dot{\hat{a}}_3{}^s)/2$, the resulting equation for $\dot{\hat{a}}_1$ is:

$$\dot{\hat{a}}_1+k_1(\text{Cos}^2\omega t+\text{Sin}^2\omega t)\hat{a}_1-(k_1/4)(\hat{a}_1{}^c-\hat{a}_1{}^s)\text{Cos }2\omega t=k_1(\text{Cos}^2\omega t+\text{Sin}^2\omega t)a_1-(k_1/4)(a_1{}^c-a_1{}^s)\text{Cos }2\omega t \quad (40)$$

If the signals are combined to give a single estimate so that $\hat{a}_1{}^c=\hat{a}_1{}^s$, and it is noted that $\text{Cos}^2\omega t+\text{Sin}^2\omega t$ is equal to unity, it can be recognized that Equation (40) is equivalent to $$\dot{\hat{a}}_1+k_1\hat{a}_1=k_1a_1+\text{ripple terms that vanish if } a_1{}^c \text{ and } a_1{}^s \text{ are carefully matched} \quad (41)$$

Similar expressions are obtained for $\hat{a}_2$ and $\hat{a}_3$. Thus, the periodic singularities are not present in an embodiment of the invention that functions in the above-described manner.

Figure 8:
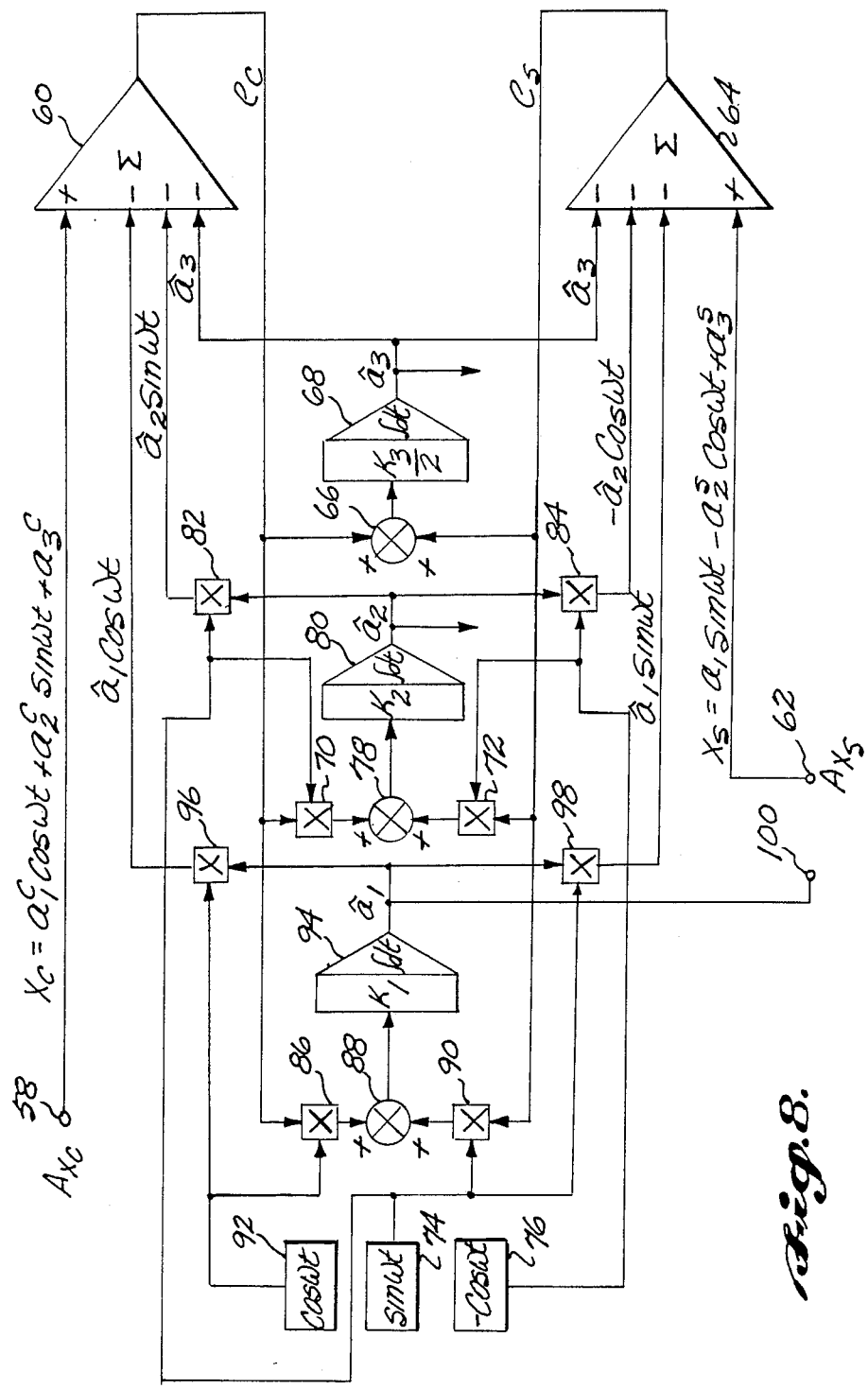
FIG. 8 is a block diagram of an embodiment of the invention that is configured for improved estimation of inertial angular rate.

FIG. 8 illustrates an analog circuit realization of the above-discussed signal processing technique for eliminating the periodic singularities in the angular rate component that is provided by the embodiment depicted in FIG. 6. In FIG. 8, the sum of the signals supplied by the first set of accelerometers ($x_c$ in FIG. 8) is connected to a terminal 58, which couples the signal to the additive input terminal of a signal summing unit 60. Three subtractive input terminals of signal summing unit 60 are connected in the manner described herein for receiving signals representative of the estimated signal components $\hat{a}_1$ Cos $\omega t$; $\hat{a}_2$ Sin $\omega t$; and, $\hat{a}_3$. Thus, signal summing unit 60 supplies a first error signal equal to the difference between $x_c$ and the estimated signal components.

A second error signal based on the sum of the signals supplied by the second pair of accelerometers is derived in a similar manner. In particular, the sum of the signals provided by the second pair of accelerometers (denoted $x_s$ in FIG. 8) is supplied to a terminal 62, which is connected to the additive input of a signal summing unit 64. Three subtractive input terminals of signal summing unit 64 are connected for receiving signals representative of $\hat{a}_1$ Sin $\omega t$; $-\hat{a}_2$ Cos $\omega t$; and, $\hat{a}_3$.

In the circuit of FIG. 8, the first and second error signals provided by signal summing units 60 and 64 (denoted as $e_c$ and $e_s$, respectively) are connected to the input terminals of an adder circuit 66, which supplies an input signal to an integrator circuit 68. As is indicated in FIG. 8, integrator circuit 68 exhibits a gain of $k_3/2$ and is connected for supplying the signal $\hat{a}_3$ to one of the subtractive input terminals of signal summing units 60 and 64. In addition, the error signals $e_c$ and $e_s$ are respectively supplied to an input terminal of a multiplier circuit 70 and a multiplier circuit 72. As is shown in FIG. 8, the second input terminal of multiplier 70 is connected for receiving a signal representative of Sin $\omega t$ (supplied by a signal source 74), and the second input terminal of multiplier circuit 72 is connected for receiving a signal representative of $-\text{Cos }\omega t$ (supplied by a signal source 76). The signal supplied by multiplier circuits 70 and 72 are coupled to the input terminals of an adder circuit 78, which has its output terminal connected to the input of an integrator circuit 80. As is indicated in FIG. 8, integrator circuit 80 exhibits a gain of $k_2$ and supplies the signal $\hat{a}_2$ to one input terminal of a multiplier circuit 82 and to one input terminal of a multiplier circuit 84. Since the second input terminal of multiplier circuit 82 is connected for receiving the signal supplied by signal source 74, it can be recognized that multiplier circuit 82 supplies the signal $\hat{a}_2$ Sin $\omega t$ to signal summing unit 60. Similarly, since the second input terminal of multiplier circuit 84 is connected for receiving the signal supplied by signal source 76, it can be recognized that multiplier circuit 84 supplies the signal $-\hat{a}_2$ Cos $\omega t$ to signal summing unit 64.

In addition, in the arrangement of FIG. 8, the first error signal $e_c$ is connected to one input terminal of a multiplier circuit 86, which has the output terminal thereof connected to one input terminal of an adder circuit 88. In a similar manner, the second error signal $e_s$ is connected to one input terminal of a multiplier circuit 90, which has the output terminal thereof connected to the second input terminal of adder circuit 88. Since the second input terminal of multiplier 86 is connected for receiving a signal representative of Cos ωt (supplied by a signal source 92) and the second input terminal of multiplier circuit 90 is connected for receiving the signal representative of Sin ωt, it can be shown that adder circuit 88 supplies a signal that includes a signal component of the form $$(a_1{}^c - \hat{a}_1)\ \text{Sin}^2\omega t + (a_1{}^s - \hat{a}_1)\ \text{Cos}^2\omega t \quad (42)$$

If the two accelerometer pairs that supply the signals $x_c$ and $x_s$ exhibit identical characteristics, $a_1{}^c$ is equal to $a_1{}^s$ and Equation (42) is equal to $(a_1 - \hat{a}_1)$.

Since the signal supplied by adder circuit 88 is integrated and scaled by the factor $k_1$, it can be recognized that integrator circuit 94 provides an output signal $\hat{a}_1$ which does not include the periodic signal singularities that are exhibited by the arrangement of FIG. 6. In this regard, since the signal $\hat{a}_1$ is multiplied by Cos ωt in multiplier circuit 96 to supply the signal representative of $\hat{a}_1$ Cos ωt to signal summing unit 60 and is multiplied by Sin ωt in multiplier 98 to supply the signal $\hat{a}_1$ Sin ωt to signal summing unit 64, it can be recognized that the arrangement of FIG. 8 realizes the signal conditions defined by Equation (40).

Although the circuit arrangement of FIG. 8 is satisfactory if the accelerometer pairs are sufficiently well-matched, it can be shown that accelerometer mismatch will cause the signal estimates provided by the arrangement of FIG. 8 to include a small amount of ripple at a frequency equal to 2ω, even when the signal processor reaches the steady state condition. In most situations, the amount of ripple produced will be relatively small and will not seriously degrade the performance of an inertial navigation system utilizing signal processing circuits of the type shown in FIG. 8. A more significant drawback of the circuit shown in FIG. 8 is that separate outputs are not provided for the components of $\hat{a}_2$ that result from the error signal provided by signal summing unit 60 and the error signal provided by signal summing unit 64. Thus a signal is not available for the previously discused correction of misalignment of the associated accelerometer pair and elimination of the phase angle φ. This can be easily remedied by including a calibration switch in the two lines that carry the error signals $e_c$ and $e_s$ so as to provide the circuit connections of FIG. 8 during normal operation of the signal processor while allowing the $e_c$ and $e_s$ signals to be individually interrupted (switches opened one at a time) for calibration and alignment. One additional minor drawback relates to a precise nongyroscopic inertial navigation system of the type being developed by the assignee of this invention, which includes a circuit arrangement for continuously aligning ("nulling") the accelerometer pairs with their associated coordinate axes. The continuous nulling circuit that has been developed for the assignee of this invention is disclosed and claimed in a U.S. patent application of Rex B. Peters, filed on even date with this application issued as U.S. Pat. No. 4,665,748, on May 19, 1987. In that arrangement, the nulling circuit is responsive to a scaled Coriolis signal that represents the Coriolis acceleration along the sensing axis of the accelerometer pair that is being continuously aligned. Since the arrangement of FIG. 8 does not provide separate Coriolis signals for each of the two accelerometer pairs, it would not be possible to maintain alignment of each of the accelerometer pairs in the manner disclosed in the referenced patent application.

Figure 9:
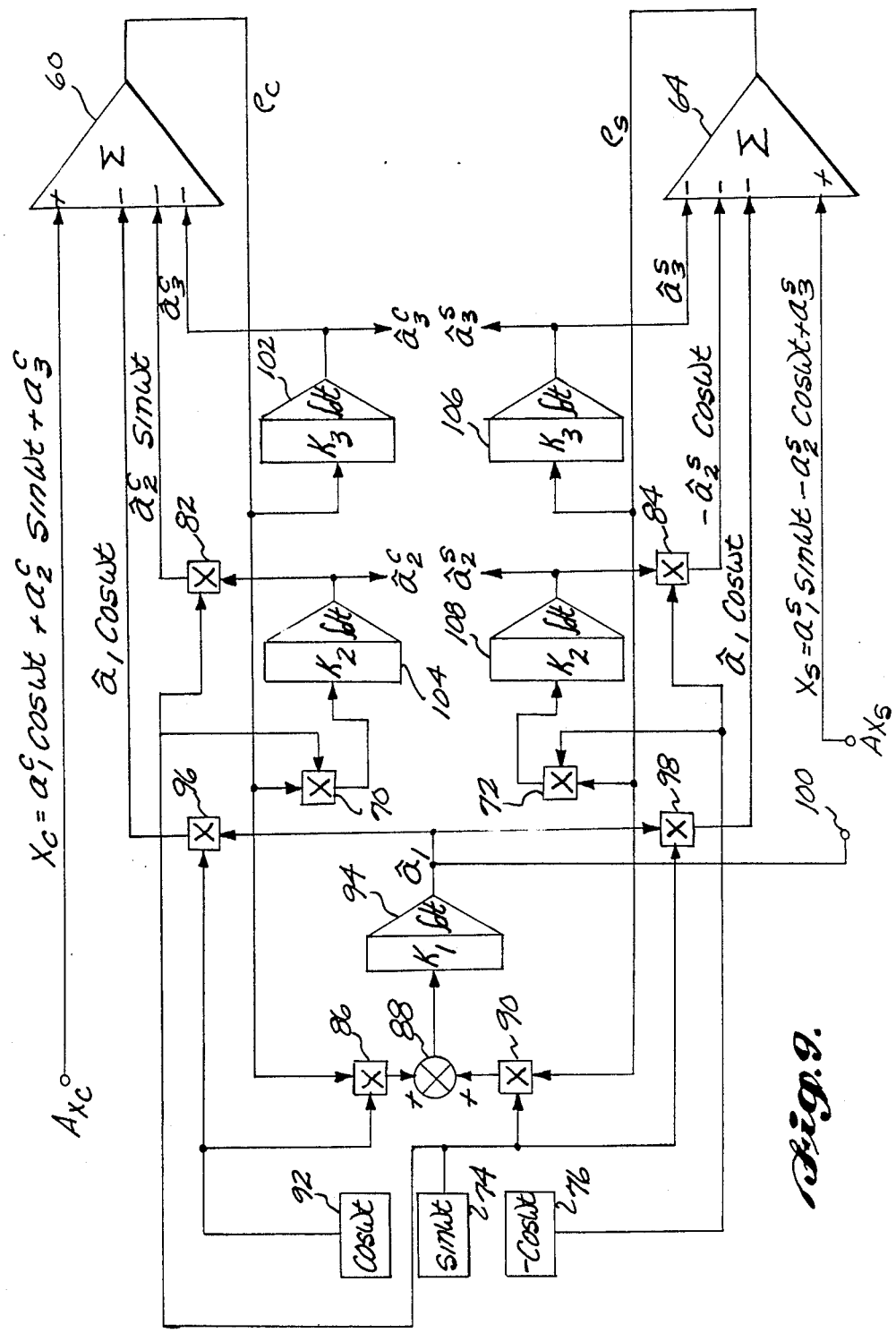
FIG. 9 is a block diagram of an embodiment of the invention that is also configured for improved signal estimation and is useful in applications of the invention wherein the accelerometers that provide the signals being processed are controlled to maintain the accelerometer force sensitive axes in the proper alignment with one another and the related coordinate system.

FIG. 9 illustrates an analog circuit realization which eliminates the previously discussed periodic singularities and which both eliminates the ripple signals produced by the signal processing realization of FIG. 8 and provides two Coriolis signals for use in system calibration or in the continuous nulling arrangement of the above-mentioned patent application (or similar arrangements) for separately aligning the two accelerometer pairs that provide the two input signals to the signal processor arrangement of FIG. 9.

In comparing the signal processor of FIG. 9 with the signal processor of FIG. 8, it can be noted that the two arrangements differ in that both the $\hat{a}_2{}^c$ and $\hat{a}_2{}^s$ signal components supplied by the signal summing units 60 and 64 and the $\hat{a}_3{}^c$ and $\hat{a}_3{}^s$ components supplied by signal summing units 60 and 64 are separately processed rather than being added to one another and processed within integrators 80 and 68 of FIG. 8. In particular, in FIG. 9 (in which identification numerals identical to identification numerals of FIG. 8 designate identically arranged circuit components), the error signal $e_c$ that is supplied by signal summing unit 60 is directly connected to the input of an integrator circuit 102 and is coupled to the input terminal of an integrator circuit 104 via multiplier circuit 70. As is indicated in FIG. 9, integrators 102 and 104 thus supply signal estimates $\hat{a}_3{}^c$ and $\hat{a}_2{}^c$ (respectively), which are estimates of the $a_3{}^c$ and $a_2{}^c$ components of the signal $x_c$ that is supplied to signal summing unit 60. In a similar manner, the error signal $e_s$, which is supplied by signal summing unit 64, is directly connected to the input terminal of an integrator circuit 106 and is coupled to the input terminal of an integrator circuit 108 via multiplier circuit 72. As is noted in FIG. 9, integrator circuit 106 provides an estimate $\hat{a}_3{}^s$ of the signal component $a_3{}^s$ that is supplied to signal summing unit 64 and integrator circuit 108 supplies an estimate $\hat{a}_2{}^s$ of the $\hat{a}_2{}^s$ component of the signal that is supplied to signal summing unit 64. Estimates $a_2{}^c$ and $a_2{}^s$ are respectively representative of the Coriolis acceleration experienced by the accelerometer pair that provides the signal $x_c$ and the Coriolis acceleration experienced by the accelerometer pair that provides the signal $x_s$. Thus, these estimates can be utilized in a calibration procedure of the previously-described type for adjusting the alignment and phase of each accelerometer pair, or can be used in separate alignment channels (e.g., the continuous nulling arrangements disclosed in the above-referenced patent application) to maintain the two accelerometer pairs in alignment with the associated axes and, thus, maintain precise operation of an inertial navigation system.

Those skilled in the art will recognize that the embodiments of the invention that are disclosed herein are exemplary in nature and that various changes and modifications can be made without departing from the scope and spirit of the invention. For example, as was previously mentioned and can be seen in view of the described mathematical relationships, the invention readily can be realized by a programmed microprocessor or other digital circuit arrangement. Further, although the invention has been disclosed in the context of only one of the paired accelerometer arrangements disclosed in the previously referenced Merhav U.S.

patent application (Ser. No. 528,776, filed September 2, 1983), the invention also is applicable to other rotating and oscillating accelerometer arrangements such as the additional arrangements disclosed in the referenced patent application (and others). In addition, although the invention has been disclosed in the context of accelerometer pairs that are oscillated as a function of Cos ωt (or Sin ωt), it can recognized that the invention will be employed in any situation in which the signal to be processed includes a first periodic signal component and a second periodic signal component that is in phase quadrature with the first signal component. Accordingly, the invention is not to be limited to the specific embodiments illustrated and described; instead, the scope of the invention is to be determined by reference to the following claims.

What is claimed is:

1. A signal processing apparatus for determining the amplitudes of components of an output signal obtained from a pair of accelerometers mounted on a moving body, the pair of accelerometers being mounted in alignment with an axis of a coordinate system associated with said moving body and being cyclically displaced in response to a drive signal, said output signal including a first periodic component having a first amplitude equal to an angular rate associated with the moving body, a second periodic component having a second amplitude, and a third component having a third amplitude representing an unmodulated random value sequence, said signal processing apparatus comprising:
   (a) means for repetitively estimating the first, second and third amplitudes;
   (b) means for repetitively producing an estimated signal corresponding to the output signal obtained from said pair of accelerometers using said estimated first, second and third amplitudes;
   (c) means for repetitively determining an error signal by subtracting the estimated signal from the output signal obtained from said pair of accelerometers; and
   (d) means for repetitively revising the three estimated amplitudes as a function of the error signal,
   (e) the error signal approaching zero as the estimated amplitudes respectively approach the first, second and third amplitudes of the output signal obtained from said pair of accelerometers, the estimated first amplitude being then equal to the angular rate associated with the moving body.

2. The signal processing apparatus of claim 1, wherein the first amplitude includes an error component caused by a misalignment between the pair of accelerometers and a path along which said pair of accelerometers are cyclically displaced, and an error component caused by a phase difference between said drive signal and said output signal, and wherein said second amplitude includes an error component caused by the misalignment between the pair of accelerometers and the path along which said pair of accelerometers are cyclically displaced, said signal processing apparatus further comprising:
   (a) means for constraining said moving body in a stationary condition;
   (b) means for monitoring the level of the estimated amplitude of the second component used to produce the estimated signal; and
   (c) means for aligning said pair of accelerometers with said path along which said accelerometers are cyclically displaced to achieve a minimum value for the estimated second amplitude signal.

3. The signal processing apparatus of claim 1, wherein the first component of the signal obtained from a pair of accelerometers includes a cosine function and the second component of said signal includes a sine function.

4. The signal processing apparatus of claim 3, further comprising:
   (a) means for moving said moving body in a controlled manner;
   (b) means for monitoring the level of the estimated amplitude of the second component used to produce the estimated signal; and
   (c) means for adjusting said phase difference between said drive signal and said output signal obtained from said accelerometer pair to achieve a minimum value for the second estimated amplitude.

5. Apparatus for determining components of angular rate of a moving body, comprising:
   (a) at least one pair of accelerometers, mounted in alignment with an axis of a coordinate system associated with said moving body, and cyclically displaced in response to a drive signal, producing an output signal of the form $a_1 f_1(\omega t) + a_2 f_2(\omega t) + a_3$, where $f_1(\omega t)$ is a periodic function of time representative of the cyclic oscillation of said accelerometer pair, $f_2(\omega t)$ is a periodic function of time that is phase quadrature with $f_1(\omega t)$, $a_1$ and $a_2$ respectively denote the amplitudes of said time varying functions $f_1(\omega t)$ and $f_2(\omega t)$, and $a_3$ represents an unmodulated random value sequence;
   (b) means for reiteratively subtracting a signal form: $\hat{a}_1 f_1(\omega t) + \hat{a}_2 f_2(\omega t) + \hat{a}_3$ from said signal of the form $a_1 f_1(\omega t) + a_2 f_2(\omega t) + a_3$ to provide an error signal where $\hat{a}_1$, $\hat{a}_2$, and $\hat{a}_3$ are signals estimating said amplitude factors $a_1$, $a_2$, and $a_3$, respectively;
   (c) means for reiteratively multiplying said error signal by $k_1 f_1(\omega t)$, where $k_1$ is a predetermined constant, to obtain a signal that is a derivative with respect to time of $\hat{a}_1$;
   (d) means for reiteratively multiplying said error signal by $k_2 f_2(\omega t)$, where $k_2$ is a predetermined constant, to obtain a signal that is a derivative with respect to time of $\hat{a}_2$;
   (e) means for reiteratively multiplying said error signal by a predetermined constant $k_3$ to obtain a signal that is a derivative with respect to time of $\hat{a}_3$;
   (f) means for reiteratively integrating said signal that is a derivative with respect to time of $\hat{a}_1$ to obtain $\hat{a}_1$;
   (g) means for reiteratively integrating said signal that is a derivative with respect to time of $\hat{a}_2$ to obtain $\hat{a}_2$;
   (h) means for reiteratively integrating said signal that is a derivative with respect to time of $\hat{a}_3$ to obtain $\hat{a}_3$;
   (i) means for reiteratively multiplying $\hat{a}_1$ by $f_1(\omega t)$;
   (j) means for reiteratively multiplying $\hat{a}_2$ by $f_2(\omega t)$; and
   (k) means for multiplying the estimated signal $\hat{a}_1$ by a predetermined scale factor to produce a signal that corresponds to said angular rate of the moving body as the error signal approaches a minimum and estimated signals $\hat{a}_1$, $\hat{a}_2$, and $\hat{a}_3$ approach the values of amplitudes $a_1$, $a_2$ and $a_3$, respectively, with successive iterations by the above-recited means (b) through (j).

6. The apparatus of claim 5, wherein $f_1(\omega t)$ is equal to cos $(\omega t)$, and $f_2(\omega t)$ is equal to sin $(\omega t)$.

7. The apparatus of claim 5, wherein said amplitude $a_1$ includes an error component caused by an unknown amount of misalignment between the pair of accelerometers that supply said signal and the path along which said accelerometers are cyclically displaced and an error component caused by a phase difference between said drive signal and said output signal obtained from said accelerometer pair, and wherein said amplitude factor $a_2$ includes an error component caused by misalignment between said accelerometer pair and the path along which said accelerometers are cyclically displaced; said apparatus further comprising:
 (a) means for constraining said moving body in a stationary condition;
 (b) means for monitoring the estimated signal $\hat{a}_2$; and
 (c) means for aligning said accelerometer pair with said path along which said accelerometers are cyclically displaced to achieve a minimum value for $\hat{a}_2$.

8. The apparatus of claim 7, further comprising:
 (a) means for moving said moving body in a controlled manner;
 (b) means for monitoring the estimated signal $\hat{a}_2$; and
 (c) means for adjusting said phase difference between said drive signal and said output signal obtained from said accelerometer pair to achieve a minimum value for $\hat{a}_2$.

9. An adaptive signal processor for determining an angular rate component of a moving body from an output signal that is obtained from at least one pair of accelerometers that are mounted in alignment with one axis of a coordinate system associated with said moving body, each said pair of accelerometers being cyclically oscillated by a signal source that drives said one or more accelerometer pairs, said output signal obtained from at least one pair of said accelerometers being of the form $a_1 f_1(\omega t) + a_2 f_2(\omega t) + a_3$, where $f_1(\omega t)$ is a first periodic function of time representative of the cyclic oscillation each said accelerometer pair, $f_2(\omega t)$ is a second periodic function of time that is in phase quadrature with $f_1(\omega t)$, $a_1$ and $a_2$ respectively denote the amplitudes of said time varying functions $f_1(\omega t)$ and $f_2(\omega t)$ and $a_3$ represents an unmodulated random value sequence said signal processor comprising:
 a signal summing unit, said signal summing unit including a first input terminal connected for receiving said output signal of the form $a_1 f_1(\omega t) + a_2 f_2(\omega t) + a_3$, a second input terminal for receiving a signal $\hat{a}_1 f_1(\omega t)$, a third input terminal for receiving a signal $\hat{a}_2 f_2(\omega t)$ and having a fourth input terminal for receiving a signal $\hat{a}_3$ where $\hat{a}_1$, $\hat{a}_2$ and $\hat{a}_3$ are estimates of said amplitude factors $a_1$, $a_2$ and $a_3$, said signal summing unit being configured and arranged for supplying a first error signal equal to the difference between the output signal applied to said first input terminal and the signals applied to said second, third and fourth input terminals;
 first and second multiplier circuits, each of said first and second multiplier circuits having an input terminal connected for receiving said first error signal;
 a first signal source for generating a signal $f_1(\omega t)$, said first signal source being connected for supplying said signal to a second input terminal of said first multiplier circuit;
 a second signal source for supplying a signal $f_2(\omega t)$, said second signal source being connected for supplying said signal to a second input terminal of said second multiplier;
 first and second scaling means, said first scaling means being connected for receiving the signal supplied by said first multiplier circuit, said second scaling means being connected for receiving the signal supplied by said second multiplier circuit;
 first and second integrator circuits, said first integrator circuit being connected for receiving the signal supplied by said first scaling means, and being connected for supplying a signal representative of $\hat{a}_1$, said second integrator circuit being connected for receiving the signal supplied by said second scaling means and being connected for supplying a signal representative of $\hat{a}_2$;
 third and fourth multiplier circuits, said third multiplier circuit being connected for receiving said signal $\hat{a}_1$ from said first integrator circuit and being connected for receiving said signal supplied by said first signal source, said fourth multiplier circuit being connected for receiving said signal $\hat{a}_2$ from said second integrator circuit and being connected for receiving said signal supplied by said second signal generator, said third and fourth multiplier circuits each having an output terminal, the output terminal of said third multiplier circuit being connected to said second input terminal of said signal summing unit, said output terminal of said fourth multiplier circuit being connected to said third input terminal of said signal summing unit;
 a third scaling means connected for receiving said first error signal, said third scaling means being operative to amplify said first error signal by a predetermined constant $k_3$;
 a third integrator circuit connected for receiving the signal supplied by said third scaling means and connected for supplying the output signal of said third integrator circuit to said fourth input terminal of said signal summing unit, wherein the signal summing unit reiteratively determines the first error signal, the first error signal approaching a minimum value with successive iterations, the signals $\hat{a}_1$, $\hat{a}_2$ and $\hat{a}_3$ respectively approaching equivalency with amplitude factors $a_1$, $a_2$ and $a_3$.

10. The signal processor of claim 9 wherein said first periodic function of said signal obtained from said accelerometer pair is Cos $\omega t$ and said second periodic function of said signal obtained from said accelerometer pair is Sin $\omega t$ and wherein said signals supplied by said first and second signal sources are Cos $\omega t$ and Sin $\omega t$, respectively.

11. The signal processor of claim 9 wherein two pairs of accelerometers are mounted in alignment with one axis of said coordinate system with said first pair of accelerometers supplying said signal of the form $a_1 f_1(\omega t) + a_2 f_2(\omega t) + a_3$ and said second pair of accelerometers supplying a signal of the form $a_1{}^s f_2(\omega t) - a_2{}^s f_1(\omega t) + a_3{}^s$ where $a_1{}^s$ and $a_2{}^s$ respectively denote the amplitudes of said periodic functions $f_1(\omega t)$ and $f_2(\omega t)$ and $a_3{}^s$ is an unmodulated random value sequence and wherein said signal processor further comprises:
 first, second and third adder circuits, said first adder circuit having an input terminal connected for receiving the output signal of said first multiplier circuit and having an output terminal connected to the input of said first scaling means, said second adder circuit having an input terminal connected to the output of said second multiplier circuit and having an output terminal connected to the input of said second scaling means, said third adder circuit having an input terminal connected for receiving said first error signal and an output terminal connected to the input of said third scaling means;

a second signal summing unit, said summing unit having first, second, third and fourth input terminals, with said first input terminal being connected for receiving said signal supplied by said second pair of accelerometers, said second signal summing unit supplying a second error signal equal to the difference between said signal supplied to said first input terminal and signals supplied to said second, third and fourth input terminals, said second error signal being supplied to a second input terminal of said third adder circuit;

fifth and sixth multiplier circuits each having an input terminal connected for receiving said second error signal, said fifth multiplier circuit having an output terminal connected to a second input terminal of said first adder circuit, said sixth multiplier circuit having an output terminal connected to a second input terminal of said second adder circuit, said fifth multiplier circuit having a second input terminal connected for receiving said signal supplied by said second signal source;

seventh and eighth multiplier circuits, said seventh multiplier circuit having first and second input terminals respectively connected for receiving the signal supplied by said first integrator circuit and said signal supplied by said second signal source and having an output terminal connected to said second input terminal of said second signal summing unit, said eighth multiplier circuit having a first input terminal connected for receiving the signal supplied by said second integrator circuit and having an output terminal connected to said third input terminal of said second signal summing unit; and a third signal source, said third signal source connected for supplying a signal $-f_1(\omega t)$ to a second input terminal of said sixth multiplier circuit and to a second input terminal of said eight multiplier circuit.

12. The signal processor of claim 11 wherein the said first periodic function of time is $\cos \omega t$ and said second periodic function of time is $\sin \omega t$ and wherein said first signal source supplies a signal $\cos \omega t$, said second signal source supplies a signal $\sin \omega t$ and said third signal source supplies a signal $-\cos \omega t$.

13. The signal processor of claim 9 wherein two pairs of accelerometers are mounted in alignment with one axis of said coordinate system with said first pair of accelerometers supplying said signal of the form $a_1 f_1(\omega t) + a_2 f_2(\omega t) + a_3$ and said second pair of accelerometers supplying a signal of the form $a_1{}^s f_2(\omega t) - a_2{}^s f_1(\omega t) + a_3{}^s$ where $a_1{}^s$ and $a_2{}^s$ respectively denote the amplitudes of said periodic functions of time $f_1(\omega t)$ and $f_2(\omega t)$ and $a_3{}^s$ is an unmodulated random value sequence and wherein said signal processor further comprises:

a second signal summing unit, said summing unit having first, second, third and fourth input terminals, with said first input terminal connected for receiving said signal supplied by said second pair of accelerometers, said second signal summing unit supplying a second error signal equal to the difference between said signal supplied to said first input terminal and signals supplied to said second, third and fourth input terminals;

fifth and sixth multiplier circuits each having an input terminal connected for receiving said second error signal, said fifth multiplier circuit having a second input terminal connected for receiving said signal supplied by said second signal source;

a third signal source, said third signal source connected for supplying a signal $-f_1(\omega t)$ to a second input terminal of said sixth multiplier circuit;

seventh and eighth multiplier circuits, said seventh multiplier circuit having an input terminal connected for receiving the signal supplied by said second signal source and a second input terminal connected for receiving the signal supplied by said first integrator circuit and having an output terminal connected to said second input terminal of said second signal summing unit, said eighth multiplier circuit having a first input terminal connected for receiving said signal supplied by said third signal source and having an output terminal connected to said third input terminal of said second signal summing unit; and fifth and sixth integrator circuits, said fifth integrator circuit connected for receiving the signal supplied by said sixth multiplier circuit and connected for supplying a signal to a second input terminal of said eighth multiplier circuit, said sixth integrator circuit connected for receiving said second error signal and connected for supplying a signal to said fourth input terminal of said second summing unit.

14. The signal processor of claim 13 wherein said first periodic function of time is $\cos \omega t$ and said second periodic function of time is $\sin \omega t$ and wherein said first signal source supplies a signal $\cos \omega t$, said second signal source supplies a signal $\sin \omega t$ and said third generator supplies a signal $-\cos \omega t$.

15. An inertial measurement unit for measuring specific force and angular rate components of a moving body, said inertial measurement unit comprising:

an accelerometer assembly including at least three pairs of accelerometers, each of said pairs of accelerometers being mounted for measuring specific force along one axis of a Cartesian coordinate system that is fixed to said moving body and being mounted for cyclic displacement of the form $f_1(\omega t)$;

accelerometer drive means connected to said accelerometer assembly for cyclically dispacing each of said three pairs of accelerometers;

a preprocessor unit connected for receiving said signal supplied by each of said accelerometers, said preprocessor unit including means for adding the signals supplied by each said pair of accelerometers and means for subtracting the signals supplied by each said pair of accelerometers to generate first, second and third signals representative of the specific force along each coordinate axis of said coordinate system and to generate first, second and third angular rate signals of the form $a_1 f_1(\omega t) + a_2 f_2(\omega t) + a_3$, where $f_2(\omega t)$ is a periodic signal that is in phase quadrature with said signal $f_1(\omega t)$, and where $a_1$ and $a_2$ denote the amplitudes of said periodic signals $f_1(\omega t)$ and $f_2(\omega t)$ respectively and $a_3$ represents an unmodulated random value sequence with the amplitude $a_1$ of each of said signals being representative of the angular rate associated with a separate axis of said coordinate system of said moving body; and first, second and third signal processing circuits, said first, second and third signal processing circuits being connected for receiving a different one of said angular rate signals supplied by said preprocessor unit and for supplying a signal representative of the angular rate for a different one of said axes of said coordinate system, each of said first, second and third signal processing circuits including (a) a signal summing unit, said signal summing unit including a first input terminal connected for receiving said signal of the form $a_1 f_1(\omega t) + a_2 f_2(\omega t) + a_3$, a second input terminal for receiving a signal $\hat{a}_1 f_1(\omega t)$, a third input terminal for receiving a signal $\hat{a}_2 f_2(\omega t)$ and having a fourth input terminal for receiving a signal $\hat{a}_3$ where $\hat{a}_1$, $\hat{a}_2$ and $\hat{a}_3$ are estimates of said amplitudes $a_1$, $a_2$ and $a_3$, said signal summing unit being configured and arranged for supplying a first error signal equal to the difference between the signal applied to said first input terminal and the signals applied to said second, third and fourth input terminals;

(b) first and second multiplier circuits, each of said first and second multiplier circuits having an input terminal connected for receiving said first error signal;

(c) a first signal source for generating a signal $f_1(\omega t)$, said first signal source being connected for supplying said signal to a second input terminal of said first multiplier circuit;

(d) a second signal source for supplying a signal $f_2(\omega t)$, said second signal source being connected for supplying said signal to a second input terminal of said second multiplier;

(e) first and second scaling means, said first scaling means being connected for receiving the signal supplied by said first multiplier circuit, said second scaling means being connected for receiving the signal supplied by said second multiplier circuit;

(f) first and second integrator circuits, said first integrator circuit being connected for receiving the signal supplied by said first scaling means, and being connected for supplying a signal representative of $\hat{a}_1$, said second integrator circuit being connected for receiving the signal supplied by said second scaling means and being connected for supplying a signal representative of $\hat{a}_2$;

(g) third and fourth multiplier circuits, said third multiplier circuit being connected for receiving said signal $\hat{a}_1$ from said first integrator circuit and being connected for receiving said signal supplied by said first signal source, said fourth multiplier circuit being connected for receiving said signal $\hat{a}_2$ from said second integrator circuit and being connected for receiving said signal supplied by said second signal generator, said third and fourth multiplier circuits each having an output terminal, the output terminal of said third multiplier circuit being connected to said second input terminal of said summing unit, said output terminal of said fourth multiplier circuit being connected to said third input terminal of said signal summing unit;

(h) a third scaling means connected for receiving said first error signal, said third scaling means for amplifying said first error signal by a predetermined constant $k_3$; and (i) a third integrator circuit connected for receiving the signal supplied by said third scaling unit and connected for supplying the output signal of said integrator circuit to said fourth input terminal of said summing unit.

16. The inertial measurement unit of claim 15 wherein said first periodic function of said signal obtained from said accelerometer pair is $\cos \omega t$ and said second periodic function of said signal obtained from said accelerometer pair is $\sin \omega t$ and wherein said signals supplied by said first and second signal sources are $\cos \omega t$ and $\sin \omega t$, respectively.

17. The inertial measurement unit of claim 15 wherein the alignment of each pair of accelerometers relative to the direction of said cyclic displacement is adjustable in response to the $\hat{a}_2$ of each of said first, second and third signal processors for aligning each pair of accelerometers with said direction of cyclic displacement.

18. The inertial measurement unit of claim 17 wherein the phase angle of the cyclic displacement of each of said three pairs of accelerometers is adjustable in response to $\hat{a}_2$ of each of said first, second and third signal processors to eliminate phase shift error between the cyclic displacement of each said accelerometer pair and the output signal provided by that accelerometer pair.

19. The inertial measurement unit of claim 15 wherein two pairs of accelerometers are mounted in alignment with each axis of said coordinate system with the first pair of accelerometers supplying said signal of the form $a_1 f_1(\omega t) + a_2 f_2(\omega t) + a_3$ and the second pair of accelerometers supplying a signal of the form $a_1{}^s f_2(\omega t) - a_2{}^s f_1(\omega t) + a_3{}^s$ where $a_1{}^s$ and $a_2{}^s$ respectively denote the amplitudes of said periodic functions $f_1(\omega t)$ and $f_2(\omega t)$ and $a_3{}^s$ is an unmodulated random value sequence and wherein each said signal processing unit further comprises:

first, second and third adder circuits, said first adder circuit having an input terminal connected for receiving the output signal of said first multiplier circuit and having an output terminal connected to the input of said first scaling means, said second adder circuit having an input terminal connected to the output of said second multiplier circuit and having an output terminal connected to the input of said second scaling means, said third adder circuit having an input terminal connected for receiving said first error signal and an output terminal connected to the input of said third scaling means;

a second signal summing unit, said summing unit having first, second, third and fourth input terminals, with said first input terminal being connected for receiving said signal supplied by said second pair of accelerometers, said second signal summing unit supplying a second error signal equal to the difference between said signal supplied to said first input terminal and signals supplied to said second, third and fourth input terminals, said second error signal being supplied to a second input terminal of said third adder circuit;

fifth and sixth multiplier circuits each having an input terminal connected for receiving said second error signal, said fifth multiplier circuit having an output terminal connected to a second input terminal of said first adder circuit, said sixth multiplier circuit having an output terminal connected to a second input terminal of said second adder circuit, said fifth multiplier circuit having a second input terminal connected for receiving said signal supplied by said second signal source;

seventh and eighth multiplier circuits, said seventh multiplier circuit having first and second input terminals respectively connected for receiving the signal supplied by said first integrator circuit and said signal supplied by said second signal source and having an output terminal connected to said second input terminal of said second signal summing unit, said eighth multiplier circuit having a first input terminal connected for receiving the signal supplied by said second integrator circuit and having an output terminal connected to said third input terminal of said second signal summing unit; and a third signal source, said third signal source connected for supplying a signal $-f_1(\omega t)$ to a second input terminal of said sixth multiplier circuit and to a second input terminal of said eighth multiplier circuit.

20. The inertial measurement unit of claim 19 wherein said first periodic function of time is Cos $\omega t$, said second periodic function of time is Sin $\omega t$ and wherein said first signal source supplies a signal Cos $\omega t$, said second signal source supplies a signal Sin $\omega t$ and said third signal source supplies a signal $-$Cos $\omega t$.

21. The inertial measurement unit of claim 20 wherein the alignment of each pair of accelerometers relative to the direction of said cyclic displacement is adjustable in response to the $\hat{a}_2$ of each of said first, second and third signal processors for aligning each pair of accelerometers with said direction of cyclic displacement.

22. The inertial measurement unit of claim 21 wherein the phase angle of the cyclic displacement of each of said three pairs of accelerometers is adjustable in response to $\hat{a}_2$ of each of said first, second and third signal processors to eliminate phase shift error between the cyclic displacement of each said accelerometer pair and the output signal provided by that accelerometer pair.

23. The inertial measurement unit of claim 15 wherein two pairs of accelerometers are mounted in alignment with one axis of said coordinate system with said first pair of accelerometers supplying said signal of the form $a_1 f_1(\omega t) + a_2 f_2(\omega t) + a_3$ and said second pair of accelerometers supplying a signal of the form $a_1{}^s f_2(\omega t) - a_2{}^s f_1(\omega t) + a_3{}^s$ where $a_1{}^s$ and $a_2{}^s$ respectively denote the amplitudes of said periodic functions of time $f_1(\omega t)$ and $f_2(\omega t)$ and $a_3{}^s$ is an unmodulated random value sequence and wherein said signal processing unit further comprises:

a second signal summing unit, said summing unit having first, second, third and fourth input terminals, with said first input terminal connected for receiving said signal supplied by said second pair of accelerometers, said second signal summing unit supplying a second error signal equal to the difference between said signal supplied to said first input terminal and signals supplied to said second, third and fourth input terminals;

fifth and sixth multiplier circuits each having an input terminal connected for receiving said second error signal, said fifth multiplier circuit having a second input terminal connected for receiving said signal supplied by said second signal source;

a third signal source, said third signal source connected for supplying a signal $-f_1(\omega t)$ to a second input terminal of said sixth multiplier circuit;

seventh and eighth multiplier circuits, said seventh multiplier circuit having an input terminal connected for receiving the signal supplied by said second signal source and a second input terminal connected for receiving the signal supplied by said first integrator circuit and having an output terminal connected to said second input terminal of said second signal summing unit, said eighth multiplier circuit having a first input terminal connected for receiving said signal supplied by said third signal source and having an output terminal connected to said third input terminal of said second signal summing unit; and fifth and sixth integrator circuits, said fifth integrator circuit connected for receiving the signal supplied by said sixth multiplier circuit and connected for supplying a signal to a second input terminal of said eighth multiplier circuit, said sixth integrator circuit connected for receiving said second error signal and connected for supplying a signal to said fourth input terminal of said second summing unit.

24. The inertial measurement unit of claim 23 wherein said first periodic function of time is Cos $\omega t$, said second periodic function of time is Sin $\omega t$ and wherein said first signal source supplies a signal Cos $\omega t$, said second signal source supplies a signal Sin $\omega t$ and said third signal source supplies a signal $-$Cos $\omega t$.

25. The inertial measurement unit of claim 24 wherein the alignment of each pair of accelerometers relative to the direction of said cyclic displacement is adjustable in response to the $\hat{a}_2$ and $\hat{a}_2{}^s$ of each of said first, second and third signal processors, for aligning each pair of accelerometers with said direction of cyclic displacement.

26. The inertial measurement unit of claim 25 wherein the phase angle of the cyclic displacement of each of said three pairs of accelerometers is adjustable in response to $\hat{a}_2$ and $\hat{a}_2{}^s$ of each of said first, second and third signal processors to eliminate phase shift error between the cyclic displacement of each said accelerometer pair and the output signal provided by that accelerometer pair.

* * * * *

UNITED STATES PATENT AND TRADEMARK OFFICE
CERTIFICATE OF CORRECTION

PATENT NO. : 4,870,588

DATED : September 26, 1989

INVENTOR(S) : Shmuel J. Merhav

It is certified that error appears in the above-identified patent and that said Letters Patent is hereby corrected as shown below:

| Column | Line | Error |
|---|---|---|
| 2 | 2 | "addition" should be --addition,-- |
| 4 | 1 | "previously mentioned" should be --previously-mentioned-- |
| 5 | 14 | "subtraced" should be --subtracted-- |
| 7 | 14 | "acceleometer" should be --accelerometer |
| 7 | 31 | "substracts" should be --subtracts-- |
| 9 | 68 | "$F_z - 1_y(qr + \dot{p})$" should be --$F_z + 1_y(qr + \dot{p})$-- |
| 11 | 26 | After the word "of" insert the word --the-- |
| 12 | 35 | "$\underline{a}$" should be --$a$-- |
| 13 | 20, 21, 24 | "$\underline{\hat{a}}$" should be --$\hat{a}$-- |
| 13 | 20 | "$\underline{\dot{a}}$" should be --$\dot{a}$-- |
| 13 | 27 | "$\underline{\hat{a}}$" should be --$\hat{a}$-- |
| 14 | 36 | after the word "to" delete the word "a" and insert the word --an-- |

UNITED STATES PATENT AND TRADEMARK OFFICE
CERTIFICATE OF CORRECTION

PATENT NO. : 4,870,588

DATED : September 26, 1989

INVENTOR(S) : Shmuel J. Merhav

It is certified that error appears in the above-identified patent and that said Letters Patent is hereby corrected as shown below:

| Column | Line | Error |
|---|---|---|
| 15 | 4 & 5 | "$\hat{a}_j = -k_j \int e \frac{\partial e}{\partial \hat{a}_j} dt$" should be $--\dot{\hat{a}}_j = -k_j \int e \frac{\partial e}{\partial \hat{a}_j} dt--$ |
| 15 | 36 | "$\hat{a}_2.$" should be $--\hat{a}_2--$ |
| 15 | 62 | "mutliplication" should be --multiplication-- |
| 16 | 7 | after "microprocessor" insert --operating-- |
| 17 | 5 | "shift0" should be --shift 0-- |
| 17 | 18 & 19 | "$k_1 \cos^2 \omega t (a_1 - a_1)$" should be $--k_1 \cos^2 \omega t (a_1 - \hat{a}_1)--$ |
| 17 | 24 | "increase" should be --increases-- |
| 17 | 30 | "continously" should be --continuously-- |
| 17 | 32 | "continously" should be --continuously-- |
| 17 | 51 | after the word "by" delete the word "to" |
| 17 | 64 & 65 | "$\dot{\hat{a}}_1 + k_1 \cos^2 \omega t\, a_1 = k_1 \cos \omega t (a_3 - \hat{a}_3)$" should be $--\dot{\hat{a}}_1 + k_1 \cos^2 \omega t\, a_1 = k_1 \cos \omega t (a_3 - \hat{a}_3)--$ |

UNITED STATES PATENT AND TRADEMARK OFFICE
CERTIFICATE OF CORRECTION

PATENT NO. : 4,870,588

DATED : September 26, 1989

INVENTOR(S) : Shmuel J. Merhav

It is certified that error appears in the above-identified patent and that said Letters Patent is hereby corrected as shown below:

| Column | Line | Error |
|---|---|---|
| 18 | 8 & 9 | "$\hat{a}_3(s) - a_3(s))$" should be --$\dot{a}_3(s) - \hat{a}_3(s))$-- |
| 18 | 26 | "$\hat{a}_1$" should be --$\dot{\hat{a}}_1$-- |
| 18 | 35 | "retification" should be "rectification-- |
| 18 | 58 & 59 | "$\hat{a}_1$" should be --$\dot{\hat{a}}_1$-- |
| 20 | 4 | "$\hat{a}_1$" should be --$\dot{\hat{a}}_1$-- |
| 21 | 46 | "discused" should be --discussed-- |
| 23 | 8 | after the word "can" insert the word --be-- |
| 25 | 50 & 51 | "$f_2(\omega t-)$" should be --$f_2(\omega t)$-- |
| 26 | 59 & 60 | "$a_1{}^S f_2(\omega t-)$" should be --$a_1^S f_2(\omega t)$-- |

UNITED STATES PATENT AND TRADEMARK OFFICE
CERTIFICATE OF CORRECTION

PATENT NO. : 4,870,588

DATED : September 26, 1989

INVENTOR(S) : Shmuel J. Merhav

It is certified that error appears in the above-identified patent and that said Letters Patent is hereby corrected as shown below:

| Column | Line | Error |
|---|---|---|
| 27 | 45 | "eight" should be --eighth-- |
| 27 | 47 | delete second occurrence of the word "the" |
| 27 | 58 & 59 | "$a_1^S f_2(\omega t-)$" should be --$a_1^S f_2(\omega t)$-- |
| 28 | 50 | "dispacing" should be --displacing-- |
| 28 | 61 & 62 | "$-a_1 f_1(\omega t-)$" should be --$a_1 f_1(\omega t)$-- |
| 29 | 13 & 14 | "$a_2 f_2(\omega t-)$" should be --$a_2 f_2(\omega t)$-- |
| 30 | 31 & 32 | "$a_2^S f_1(\omega t-)$" should be --$a_2^S f_1(\omega t)$-- |
| 31 | 43 & 44 | "$a_1^S f_2(\omega t-)$" should be --$a_1^S f_2(\omega t)$-- |

UNITED STATES PATENT AND TRADEMARK OFFICE
CERTIFICATE OF CORRECTION

PATENT NO. : 4,870,588

DATED : September 26, 1989

INVENTOR(S) : Shmuel J. Merhav

It is certified that error appears in the above-identified patent and that said Letters Patent is hereby corrected as shown below:

| Column | Line | Error |
|--------|------|-------|
|        |      | Applicant also notes that there are numerous instances in the patent where superscripts and subscripts were printed in a manner inconsistent with the application as filed and amended; however, since the intended meaning is clear, these errors are not separately listed. |

Signed and Sealed this

Eighteenth Day of June, 1991

*Attest:*

HARRY F. MANBECK, JR.

*Attesting Officer*      *Commissioner of Patents and Trademarks*